United States Patent
Jahnke et al.

(10) Patent No.: US 10,892,507 B2
(45) Date of Patent: Jan. 12, 2021

(54) REFORMER-ELECTROLYZER-PURIFIER (REP) ASSEMBLY FOR HYDROGEN PRODUCTION, SYSTEMS INCORPORATING SAME AND METHOD OF PRODUCING HYDROGEN

(71) Applicant: FuelCell Energy, Inc., Danbury, CT (US)

(72) Inventors: Fred C. Jahnke, Rye, NY (US); Matthew Lambrech, Sherman, CT (US); Pinakin Patel, Danbury, CT (US); Mohammad Farooque, Marlboro, NJ (US); Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 395 days.

(21) Appl. No.: 15/115,186

(22) PCT Filed: Jan. 30, 2015

(86) PCT No.: PCT/US2015/013837
§ 371 (c)(1),
(2) Date: Jul. 28, 2016

(87) PCT Pub. No.: WO2015/116964
PCT Pub. Date: Aug. 6, 2015

(65) Prior Publication Data
US 2016/0351930 A1    Dec. 1, 2016

Related U.S. Application Data

(60) Provisional application No. 61/934,466, filed on Jan. 31, 2014.

(51) Int. Cl.
*H01M 8/0612*    (2016.01)
*H01M 8/18*    (2006.01)
(Continued)

(52) U.S. Cl.
CPC ............ *H01M 8/0618* (2013.01); *C25B 1/04* (2013.01); *C25B 15/08* (2013.01);
(Continued)

(58) Field of Classification Search
CPC .. H01M 8/0618; H01M 8/0668; H01M 8/186; H01M 8/145; H01M 8/12; H01M 2008/147; H01M 2008/1293
See application file for complete search history.

(56) References Cited

U.S. PATENT DOCUMENTS 3,094,390 A    6/1963    Vander
3,180,813 A    4/1965    Wasp et al.
(Continued)

FOREIGN PATENT DOCUMENTS

CA    1242985 A    8/1985
CA    2937948 A    8/2015
(Continued)

OTHER PUBLICATIONS

Heidenbrecht et al., Molten Carbonate Fuel Cell (MCFC) with Internal Reforming: model-based analysis of cell dynamics, Chemical Engineering Science, vol. 58, issues 3-6, 2003, pp. 1029-1036.
(Continued)

*Primary Examiner* — Osei K Amponsah
(74) *Attorney, Agent, or Firm* — Foley & Lardner LLP

(57) ABSTRACT

A high temperature electrolyzer assembly comprising at least one electrolyzer fuel cell including an anode and a cathode separated by an electrolyte matrix, and a power supply for applying a reverse voltage to the at least one electrolyzer fuel cell, wherein a gas feed comprising steam and one or more of $CO_2$ and hydrocarbon fuel is fed to the anode of the at least one electrolyzer fuel cell, and wherein, when the power supply applies the reverse voltage to the at least one electrolyzer fuel cell, hydrogen-containing gas is
(Continued)

generated by an electrolysis reaction in the anode of the at least one electrolyzer fuel cell and carbon dioxide is separated from the hydrogen-containing gas so that the at least one electrolyzer fuel cell outputs the hydrogen-containing gas and separately outputs an oxidant gas comprising carbon dioxide and oxygen.

13 Claims, 16 Drawing Sheets

(51) Int. Cl.
| | | |
|---|---|---|
| | H01M 8/12 | (2016.01) |
| | H01M 8/14 | (2006.01) |
| | H01M 8/0668 | (2016.01) |
| | C25B 15/08 | (2006.01) |
| | C25B 1/04 | (2006.01) |
| | H01M 8/04089 | (2016.01) |
| | H01M 8/1018 | (2016.01) |
| | H01M 8/124 | (2016.01) |

(52) U.S. Cl.
CPC ..... *H01M 8/04089* (2013.01); *H01M 8/0668* (2013.01); *H01M 8/12* (2013.01); *H01M 8/145* (2013.01); *H01M 8/186* (2013.01); H01M 2008/1095 (2013.01); H01M 2008/1293 (2013.01); H01M 2008/147 (2013.01); Y02E 60/366 (2013.01); Y02E 60/526 (2013.01); Y02E 60/528 (2013.01); Y02P 20/129 (2015.11)

(56) References Cited

U.S. PATENT DOCUMENTS

| | | |
|---|---|---|
| 4,849,091 A | 7/1989 | Cabrera et al. |
| 5,071,719 A | 12/1991 | Rostrup-Nielsen et al. |
| 5,346,613 A | 9/1994 | Lomas et al. |
| 5,346,778 A | 9/1994 | Ewan et al. |
| 5,413,878 A | 5/1995 | Williams et al. |
| 5,711,770 A | 1/1998 | Malina |
| 5,928,806 A | 7/1999 | Olah et al. |
| 6,187,465 B1 | 2/2001 | Galloway |
| 7,070,874 B2 | 7/2006 | Blanchet et al. |
| 7,150,927 B2 | 12/2006 | Hickey et al. |
| 7,201,979 B2 | 4/2007 | McElroy et al. |
| 7,323,270 B2 | 1/2008 | Patel et al. |
| 7,353,085 B2 | 4/2008 | Rusta-Sallehy et al. |
| 7,364,810 B2 | 4/2008 | Sridhar et al. |
| 7,396,603 B2 | 7/2008 | Farooque et al. |
| 7,422,810 B2 | 9/2008 | Venkataraman et al. |
| 7,482,078 B2 | 1/2009 | Sridhar et al. |
| 7,575,822 B2 | 8/2009 | Mitlitsky et al. |
| 7,704,618 B2 | 4/2010 | Venkataraman et al. |
| 7,781,112 B2 | 8/2010 | Sridhar et al. |
| 7,833,668 B2 | 11/2010 | Ballantine et al. |
| 7,846,599 B2 | 12/2010 | Ballantine et al. |
| 7,878,280 B2 | 2/2011 | Sridhar et al. |
| 7,887,971 B2 | 2/2011 | Hickey et al. |
| 7,901,814 B2 | 3/2011 | Venkataraman et al. |
| 8,053,136 B2 | 11/2011 | Hickey et al. |
| 8,071,241 B2 | 12/2011 | Sridhar et al. |
| 8,071,246 B2 | 12/2011 | Mitlitsky et al. |
| 8,277,992 B2 | 10/2012 | Mitlitsky et al. |
| 8,435,689 B2 | 5/2013 | Venkataraman |
| 8,663,859 B2 | 3/2014 | Mitlitsky et al. |
| 8,852,820 B2 | 10/2014 | Perry et al. |
| 9,190,693 B2 | 11/2015 | Sridhar et al. |
| 9,413,017 B2 | 8/2016 | Bandhauer et al. |
| 9,478,819 B2 | 10/2016 | Lambrech et al. |
| 9,722,273 B2 | 8/2017 | Perry et al. |
| 9,911,989 B2 | 3/2018 | McElroy et al. |
| 9,947,955 B2 | 4/2018 | Sridhar et al. |
| 10,096,840 B1 | 10/2018 | Venkataraman et al. |
| 10,361,442 B2 | 7/2019 | Perry et al. |
| 10,581,090 B2 | 3/2020 | Ballantine et al. |
| 2002/0004154 A1 | 1/2002 | Pastula et al. |
| 2004/0180249 A1 | 9/2004 | Pham et al. |
| 2004/0185313 A1 | 9/2004 | Halter |
| 2004/0202914 A1 | 10/2004 | Sridhar et al. |
| 2005/0058863 A1 | 3/2005 | Wang et al. |
| 2005/0112425 A1* | 5/2005 | Hsu .......................... C01B 3/382 |
| | | 429/410 |
| 2005/0123810 A1 | 6/2005 | Balan |
| 2005/0197743 A1 | 9/2005 | Rusta-Sallehy et al. |
| 2005/0271914 A1 | 12/2005 | Farooque et al. |
| 2006/0140823 A1 | 6/2006 | Katikaneni et al. |
| 2006/0248800 A1 | 11/2006 | Miglin et al. |
| 2008/0060935 A1 | 3/2008 | Hartvigsen |
| 2008/0075990 A1 | 3/2008 | Isozaki et al. |
| 2008/0155984 A1 | 7/2008 | Liu et al. |
| 2008/0314741 A1* | 12/2008 | Balestrino ................. C25B 1/04 |
| | | 204/274 |
| 2009/0110989 A1 | 4/2009 | Daly et al. |
| 2009/0158662 A1 | 6/2009 | Towler |
| 2009/0226775 A1 | 9/2009 | Jahnke et al. |
| 2009/0235587 A1 | 9/2009 | Hawkes et al. |
| 2010/0047641 A1 | 2/2010 | Jahnke et al. |
| 2010/0215566 A1 | 8/2010 | Lourenco et al. |
| 2010/0266923 A1 | 10/2010 | McElroy et al. |
| 2010/0304228 A1 | 12/2010 | Majarov et al. |
| 2011/0104577 A1 | 5/2011 | Cui et al. |
| 2011/0189567 A1 | 8/2011 | Venkataraman et al. |
| 2012/0068661 A1 | 3/2012 | Fracas |
| 2013/0052548 A1 | 2/2013 | Nedergaard Clausen et al. |
| 2013/0108936 A1 | 5/2013 | McElroy et al. |
| 2013/0126038 A1 | 5/2013 | Jamal et al. |
| 2013/0177824 A1 | 7/2013 | Cui et al. |
| 2013/0251598 A1 | 9/2013 | Gil et al. |
| 2013/0260268 A1 | 10/2013 | Shapiro et al. |
| 2014/0076213 A1 | 3/2014 | Ingram et al. |
| 2014/0080076 A1 | 3/2014 | Lutz |
| 2014/0093798 A1 | 4/2014 | Snyder et al. |
| 2014/0272626 A1 | 9/2014 | Berlowitz et al. |
| 2014/0272629 A1 | 9/2014 | Berlowitz et al. |
| 2015/0280265 A1 | 10/2015 | McLarty |
| 2016/0344045 A1 | 11/2016 | Ishino et al. |
| 2016/0351930 A1 | 12/2016 | Jahnke et al. |
| 2020/0161671 A1 | 5/2020 | Ballantine et al. |

FOREIGN PATENT DOCUMENTS

| | | |
|---|---|---|
| CN | 101427408 A | 5/2009 |
| CN | 104847424 A | 8/2015 |
| CN | 106133973 a | 11/2016 |
| DE | 10 2012 206 541 A1 | 10/2013 |
| EP | 1 620 906 | 2/2006 |
| EP | 1 665 441 | 6/2006 |
| EP | 2 784 187 A1 | 10/2014 |
| EP | 3 054 519 A1 | 8/2016 |
| JP | 51-008405 A | 1/1976 |
| JP | 60-235893 | 11/1985 |
| JP | 06-005301 A | 1/1994 |
| JP | 11-169661 A | 6/1999 |
| JP | 11-22347 A | 8/1999 |
| JP | 2002-319428 | 10/2002 |
| JP | 2004-099927 A | 4/2004 |
| JP | 2004-311159 A | 11/2004 |
| JP | 2007-162531 | 6/2007 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-518559 A | 5/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |
| JP | 2005-293934 A | 10/2015 |
| JP | 6096790 B2 | 3/2017 |
| JP | 2017-511956 | 4/2017 |
| KR | 20110114816 | 5/2005 |

(56) References Cited

FOREIGN PATENT DOCUMENTS

| KR | 102007005713 A | 6/2007 |
|---|---|---|
| KR | 1020160114632 A | 10/2016 |
| WO | WO-01/04045 | 1/2001 |
| WO | WO-2007/015689 A2 | 2/2007 |
| WO | WO-2009/031747 A1 | 3/2009 |
| WO | WO-2010/021997 A2 | 2/2010 |
| WO | WO-2013/029701 A1 | 3/2013 |
| WO | WO-2015/116964 A1 | 8/2015 |
| WO | WO-2015/153064 A1 | 10/2015 |
| WO | WO-2017/087405 A1 | 5/2017 |

OTHER PUBLICATIONS

International Preliminary Report on Patentability issued in corresponding application No. PCT/US2015/013837 dated Aug. 2, 2016 (12 pages).
International Search Report and Written Opinion dated May 6, 2014 in PCT/US2015/013837 (13 pages).
Extended European Search Report in EP 15744017.3 dated Aug. 16, 2017 (12 pages).
International Search Report and Written Opinion dated Jul. 26, 2017 in PCT/US17/30230 (13 pages).
Caprile et al.; Carbon capture: Energy wasting technologies or the MCFCs challenge? International Journal of Hydrogen Energy; 2011 ;36:10269-77.
Desideri et al.; MCFC-based CO2 capture system for small scale CHP plants. International Journal of Hydrogen Energy. 2012;37: 19295-303.
Kasai, C02 Electrochemical Separation by Mol ten Carbonate Technology, Fuel Chemistry Division Preprints, 2002, 47(1 ), 70.
Office Action dated in Japanese Pat. Appl. No. 2016-549225
Extended European Search Report received in EP18182124.0 dated Dec. 7, 2018 (6 pages).
International Search Report and Written Opinion in PCT/162018/ 058968 dated Jan. 23, 2019 (16 pages).
Notice of Allowance on U.S. Appl. No. 15/980,305 dated Feb. 14, 2019.
Non-Final Office Action on U.S. Appl. No. 15/815,556 dated Oct. 28, 2019.
Notice of Allowance on U.S. Appl. No. 15/980,356 dated Sep. 24, 2019.
International Search Report and Written Opinion in PCT/162018/ 059191 dated Mar. 27, 2019 (20 pages).
Office Action in JP2018-116336 dated Mar. 26, 2019, with English translation (8 pages).
Office Action in JP2018-525557 dated May 24, 2019, with English translation (14 pages).
Second Office Action in JP2018-525361 dated Mar. 26, 2019, with English translation (6 pages).
Extended European Search Report in EP16866931 dated May 2, 2019 (10 pages).
Extended European Search Report on EP16866959.6 dated May 3, 2019 (10 pages).
Extended European Search Report received in EP16866965.3, dated Jun. 17, 2019 (7 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
Extended European Search Report dated Oct. 26, 2018 for EP18182210.7 (8 pages).
International Search Report and Written Opinion dated Jul. 19, 2017 for PCT/US17/28321 (16 pages).
International Search Report and Written Opinion for PCT/US16/ 61981 dated Jan 19 2017 (8 pages).
International Search Report and Written Opinion in PCT/US/16/ 62276, dated Jan. 31, 2017 (8 pages).
International Search Report and Written Opinion in PCT/US16/ 62069 dated Jan. 27, 2017 (10 pages).
International Search Report and Written Opinion on PCT/US16/ 62083, dated Jan. 31, 2017, 8 pages.
Notice of Preliminary Rejection for KR Appl. No. 10-2018-7017810 dated Nov. 12, 2018, with English translation (13 pages).
Office Action for KR 10-2018-7016036 dated Nov. 12, 2018, with English translation (13 pages) .
Office Action in JP 2018-116336 dated Sep. 21, 2018 (7 pages).
Office Action in JP 2018-525361 dated Sep. 21, 2018 (6 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available, (4 pages).
Extended European Search Report in EP16867038.8 dated Jun. 27, 2019 (8 pages).
Third Office Action in JP 2018-116336 dated Dec. 20, 2019, with English translation (9 pages).
Campanari et al., "Using MCFC for high efficiency CO2 capture from natural gas combined cycles: Comparison of internal and external reforming", Applied Energy 112 (2013) 772-783).
Final Office Action in U.S. Appl. No. 15/815,556 dated Apr. 8, 2020.
Hu et al., "Electrochemical performance of reversible molten carbonate fuel cells", International Journal of Hydrogen Energy, vol. 39, Issue 23, Aug. 4, 2014, pp. 12323-12329.
Itou et al., "High Efficiency CO2 Separation and Concentration System by Using Molten Carbonate", Greenhouse Gas Control Technologies - 6th International Conference Proceedings of the 6th International Conference on Greenhouse Gas Control Technologies Oct. 2002, Kyoto, Japan Volume, pp. 1331-1334.
Kasai et al., "High Temperature Electrochemical Separation of Carbon Dioxide Using Molten Carbonate", Denki Kagaku, 66, No. 6, 1998, pp. 635-640.
Millet et al., "Chapter 2—Water Electrolysis Technologies", Renewable Hydrogen Technologies, 2013.
Moreno et al., International Status of Molten Carbonate Fuel Cell (Jell (MCFC) Technology, Jan. 2008.
Non-Final Office Action in U.S. Appl. No. 15/980,291 dated Jun. 22, 2020 (21 pages).
Wang et al., "The intensification technologies to water electrolysis for hydrogen production—A review", Renewable and Sustainable Energy Reviews 29 (2014) 573-588.
First Office Action in CN 2016800735683, dated Aug. 3, 2020, with English translation (16 pages).
Non-Final Office Action in U.S. Appl. No. 16/266,699, dated Oct. 16, 2020.

* cited by examiner

REFORMER-ELECTROLYZER-PURIFIER (REP) ASSEMBLY FOR HYDROGEN PRODUCTION, SYSTEMS INCORPORATING SAME AND METHOD OF PRODUCING HYDROGEN

Cross Reference to Related Applications

This application is a U.S. National Stage Application under 35 U.S.C. § 120 of PCT/US2015/013837, filed Jan. 30, 2015, which claims the benefit of U.S. Provisional Application 61/934,466, filed Jan. 31, 2014, which are both incorporated herein by reference in their entirety.

STATEMENT OF GOVERNMENT RIGHTS

The Government has rights in this invention pursuant to Contract No. DE-EE0006669 awarded by the U.S. Department of Energy.

BACKGROUND OF THE INVENTION

This invention relates to production of hydrogen from fuel, such as natural gas, methane, ADG digester gas and others, and in particular, to using a fuel reformer-electrolyzer-purifier assembly for hydrogen production and capable of being integrated with a fuel cell system and other systems. This invention further relates to various applications of the fuel reformer-electrolyzer-purifier assembly and systems incorporating the same.

Hydrocarbon fuels, such as methane, propane, natural gas, coal gas, etc. are widely used in energy consumption devices as well as for production of energy. Many devices and systems utilizing hydrocarbon fuel, including fuel cells, require fuel to be reformed to produce hydrogen (H2). For example, fuel cell cars require high purity hydrogen as fuel for operation. Currently, low temperature electrolysis and steam methane reforming are used for hydrogen production from hydrocarbon fuels. In low temperature electrolysis, an electrolyzer generates hydrogen from water. This process is highly inefficient due to the high power consumption required by low temperature electrolysis.

Conventional technologies for production of hydrogen from natural gas and other fuels also suffer from lower efficiency and excess $CO_2$ production due to incomplete conversion of methane and CO to hydrogen and from other disadvantages. For example, conventional hydrogen production and separation systems which use a steam methane reformer (SMR) coupled to a pressure swing adsorption (PSA) device suffer from the disadvantage of not converting all of the methane to hydrogen, and thus a substantial amount of feed energy is converted to heat. This generation of heat makes it impractical for the system to use waste heat from other sources to improve efficiency and also increases $CO_2$ emissions. These conventional systems also suffer from efficiency losses and cost increases when scaled down from today's typical 500,000 kilograms per day systems and typically produce a significant amount of NOx in addition to the high CO2 emissions. This can make obtaining permission to install and operate these conventional systems difficult, particularly in nonindustrial areas. For renewable feeds, such systems operate even less efficiently due to the dilution of the feed with $CO_2$ and required compression of the feed stream.

SUMMARY OF THE INVENTION

The objective of the present invention is to provide a low cost system for producing hydrogen with low greenhouse emissions.

The present invention reforms and purifies hydrogen from natural gas and other fuels in one step. Electricity used to electrochemically purify the hydrogen at high temperature produces additional hydrogen from steam electrolysis at the same time. Moreover, waste heat is utilized to drive the endothermic reforming reaction, eliminating emissions which would otherwise be produced by burning fuel. The system of the present invention incorporates a high temperature electrochemical purification system to remove $CO_2$ from the reformed gas during the reforming process and to drive the conversion of methane to $H_2$ and $CO_2$ to completion, producing hydrogen from fuel in a manner which approaches the theoretical minimum of $CO_2$ emissions.

The single step system of the present invention simplifies operations and results in a low cost system. In addition, the system of the present invention can generate hydrogen for both central and distributed production and has other possible uses, such as enabling $CO_2$ capture and energy storage.

Moreover, the present invention generates hydrogen from reforming fuel, such as natural gas, and high temperature electrolysis, lowering the marginal production cost of hydrogen. As a result, the total cost of hydrogen is economically attractive.

The present invention is directed to a high temperature electrolyzer assembly comprising: at least one electrolyzer fuel cell including an anode and a cathode separated by an electrolyte matrix, and a power supply for applying a reverse voltage to the at least one electrolyzer fuel cell, wherein, when the power supply applies the reverse voltage to the at least one electrolyzer fuel cell, hydrogen-containing gas is generated by an electrolysis reaction in the anode of at least one electrolyzer fuel cell and carbon dioxide is separated from the hydrogen-containing gas so that the at least one electrolyzer fuel cell outputs the hydrogen-containing gas and separately outputs an oxidant gas comprising carbon dioxide. The hydrogen-containing gas output from the at least one electrolyzer fuel cell comprises 95% or greater hydrogen, and the oxidant gas comprises a mixture of carbon dioxide and oxygen. In certain embodiments, the high temperature electrolyzer assembly includes a plurality of electrolyzer fuel cells connected in series and formed into a fuel cell stack. In some embodiments, each electrolyzer fuel cell is a molten carbonate fuel cell. In certain embodiments, the assembly further comprises one or more reformers for reforming hydrocarbon fuel and outputting reformed or partially reformed fuel to the at least one electrolyzer fuel cell. In such cases, the at least one electrolyzer fuel cell is further adapted to react methane with water to produce hydrogen and carbon dioxide, and shift carbon monoxide with water to produce hydrogen. Particularly, the one or more reformers may comprise one or more internally reforming fuel cells including reforming catalyst, and in such embodiments, the high temperature electrolyzer assembly comprises a plurality of electrolyzer fuel cells, and the one or more reforming fuel cells and the plurality of electrolyzer fuel cells are formed into a fuel cell stack.

The high temperature electrolyzer assembly of the present invention may further include a controller for controlling the power supply to apply a predetermined amount of the reverse voltage to the at least one electrolyzer fuel cell. The predetermined amount of the reverse voltage is greater than 1.0 volt. Moreover, the high temperature electrolyzer assembly may be configured to operate in one of a hydrogen producing mode and a power producing mode, and the controller controls the power supply to apply the reverse voltage to the at least one electrolyzer fuel cell when the high temperature electrolyzer assembly operates in the hydrogen producing mode so that the at least one electrolyzer fuel cell generates the hydrogen-containing gas and controls the power supply not to apply the reverse voltage to the at least one electrolyzer fuel cell when the high temperature electrolyzer assembly operates in the power producing mode so that the at least one electrolyzer fuel cell generates power from fuel.

Various systems utilizing the high temperature electrolyzer assembly are also described. The systems described below include, but are not limited to, a reformer-electrolyzer-purifier system that produces hydrogen-containing gas, a power production and hydrogen generation system that incorporates the high temperature electrolyzer assembly and a high temperature fuel cell system, a reforming system that generates carbon dioxide gas for capture, a system for generating electrical power including a low temperature fuel cell and the high temperature electrolyzer assembly, an energy storage system for storing excess power as hydrogen, a gas conversion system for converting one gas to another gas with lower CO2 content, a carbon dioxide capturing system for generating high purity carbon dioxide using the high temperature electrolyzer and a coal powered assembly, and a combined gasifier and hydrogen generation system. Various methods that generate hydrogen-containing gas and separate CO2 for capture are also described.

BRIEF DESCRIPTION OF THE DRAWINGS

The above and other features and aspects of the present invention will become more apparent upon reading the following detailed description in conjunction with the accompanying drawings in which.

DETAILED DESCRIPTION

The present invention is directed to a high temperature electrolyzer assembly, also referred to throughout the specification as a reformer-electrolyzer-purifier (REP) assembly, and various systems including the REP assembly. As described below, the REP assembly includes at least one electrolyzer fuel cell and may include a plurality of electrolyzer fuel cells formed in a fuel cell stack, also referred to as a REP stack. The at least one electrolyzer fuel cell is operated in reverse so as to electrolyze CO2 and water to produce hydrogen, and to purify the hydrogen by removing the $CO_3^=$. The CO2 may be provided by a hydrocarbon, such as methane, and removing the $CO_3^=$ drives the reforming reaction to completion. Other reactions may occur in the at least one electrolyzer fuel cell, as described below and shown in the accompanying Figures.

The REP stack preferably comprises a molten carbonate fuel cell stack and the REP assembly includes a power supply for supplying power to the REP stack for driving the electrolysis reactions to completion. A controller may be included in the REP assembly and/or in the REP system for controlling the power supply and for controlling other operations and parts of the REP assembly and/or REP system. Control operations are described in more detail below. Although the specification describes the REP assembly, the REP stack and the REP system as including reforming, such as internal or external reforming, it is also contemplated that the REP assembly, the REP stack and/or the REP system may omit internal and/or external reforming, and may be used for electrolyzing a supply gas containing CO2 and purifying hydrogen without reforming.

Figure 1:
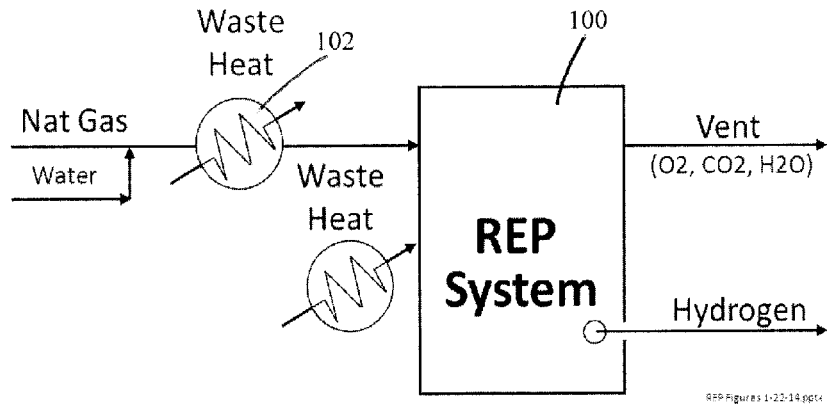
FIG. 1 shows a schematic view of the reformer-electrolyzer-purifier (REP) system including a REP assembly of the present invention.

FIG. 1 shows a schematic view of the reformer-electrolyzer-purifier (REP) system 100 of the present invention. As shown in FIG. 1, fuel, such as natural gas, ADG digester gas or other suitable fuel, is pre-heated using lower level waste heat in a pre-heater 102 and thereafter supplied to the REP system 100. The fuel may be humidified or mixed with water before or after being pre-heated. In the REP system 100, the fuel is reformed by reacting with steam to produce hydrogen, CO, and carbon dioxide, and hydrogen is purified at high temperature (reforming temperatures) to separate it from other reaction products and drive the reforming reaction to completion. The REP system 100 outputs hydrogen and separately outputs other reaction products, including oxygen, and carbon dioxide. As shown, high level waste heat is supplied to the REP system 100 to drive the endothermic reforming reaction so that all of the fuel is converted to hydrogen, thereby reducing $CO_2$ emissions resulting from incomplete conversion of methane to hydrogen.

Figure 2:
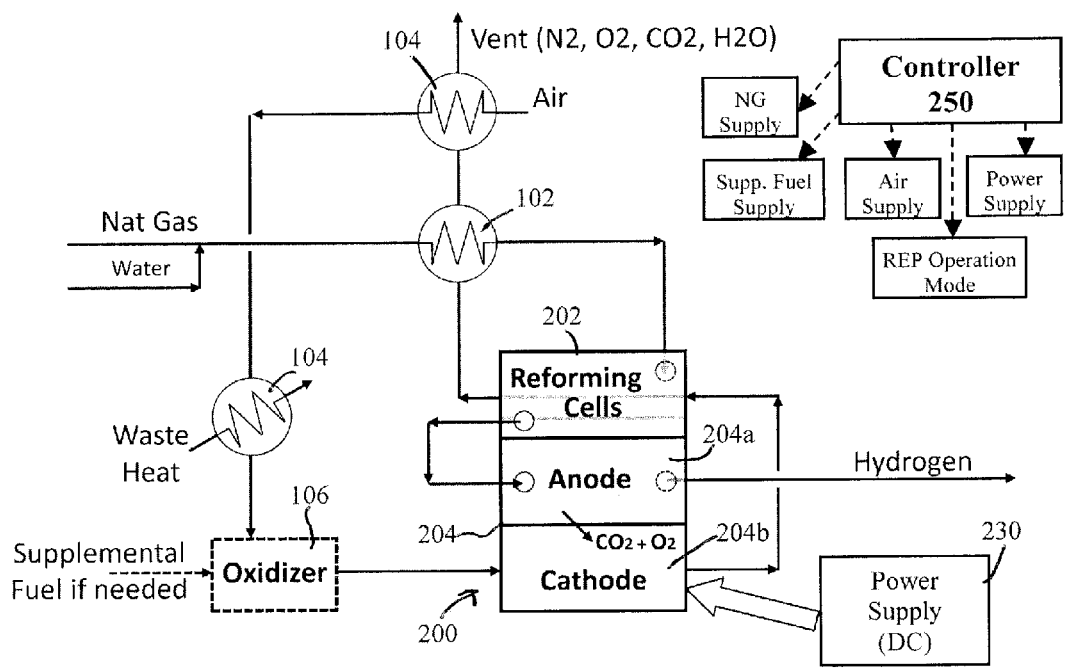
FIG. 2 shows a more detailed view of the reformer-electrolyzer-purifier system.

FIG. 2 shows a more detailed view of the REP system 100 which comprises a REP assembly including a REP stack 200 and a power supply 230. The REP stack 200 comprises fuel cell components and may include one or more reforming only cells, or reforming units, 202 and one or more REP fuel cells 204, each of which comprises an anode 204a and a cathode 204b separated by an electrolyte matrix. The REP fuel cells are configured the same as conventional MCFC fuel cells but are operated in reverse by applying a reverse voltage of greater than 1.0 Volt, typically in the 1.15 to 1.5 Volt range. The reforming only units 202 and REP fuel cells 204 are assembled in a stack and are connected in series so that fuel is first conveyed through the reforming only cells 202 and thereafter through the anodes 204a of the REP fuel cells 204. The cathodes 204b may receive hot gas, such as air, supplied to the system and a CO2/O2 gas mixture produced in purification operation from the anode 204a of the REP fuel cell. In one illustrative embodiment, the fuel cell stack 200 of the REP system 100 incorporates components developed for commercial molten carbonate fuel cell technology, such as MCFC/DFC® developed by FuelCell Energy, Inc. However, it is understood that other types of molten carbonate fuel cells may be used in the REP system 100.

As also shown in FIG. 2, the REP system 100 may include one or more pre-heaters which utilize waste heat from the cells 204 of the REP system and/or produced by other devices external to the REP system and/or integrated with the REP system. The pre-heater 102 uses waste heat from the fuel cells 204 and reforming only cells 202 to pre-heat fuel, which may be mixed with water or humidified, prior to supplying the fuel to the reforming only cells 202. Other pre-heater(s) 104 may be used for pre-heating gas supplied to the system using waste heat from other devices such as a high temperature fuel cell being used to produce power. Moreover, as shown in FIG. 2, an oxidizer 106 may be provided for increasing the heat to the REP system using supplemental fuel by oxidizing the supplemental fuel with air and generating hot oxidant gas which is then supplied to the REP fuel cell cathodes 204b.

In the present invention, the REP fuel cell stack 200 is operated in purification mode, or a hydrogen producing mode, as a purifying reforming electrolyzer and during such operation, removes almost all of the carbon from the system as $CO_2$ and produces nearly pure hydrogen from the reformed methane. In addition, the REP fuel cell stack 200 also efficiently produces additional hydrogen by dissociation of steam (electrolysis) at the same time. Thus, when natural gas is supplied to the REP system, about 80% of the hydrogen output is produced from the natural gas reformation and the other 20% of the hydrogen is provided by the electrolysis reaction. This reformer-electrolyzer-purifier (REP) system 100 produces hydrogen efficiently and with minimal $CO_2$ emissions.

As seen in FIG. 2, fuel, such as natural gas and/or renewable fuel, plus water are fed into the system 200. This fuel feed is heated in the pre-heater 102 and then routed to the reforming cells 202 and the REP fuel cells 204 where the almost all of the gas is reformed to hydrogen and CO. Heat for this endothermic reforming reaction is provided by external waste heat 104, which is provided from other waste heat generating devices. In certain embodiments, supplemental or extra fuel is used as a backup or to raise the level of the waste heat, particularly when interruptible renewable waste heat such as wind power or solar heat is used as the source of waste heat. For example, in FIG. 2, an oxidizer 106 is provided in the system which receives supplemental fuel and air and oxidizes the supplemental fuel to produce heated gas for use in the cathode. In this way, the oxidizing reaction raises the level of waste heat that is used in the REP cells.

Figure 4:
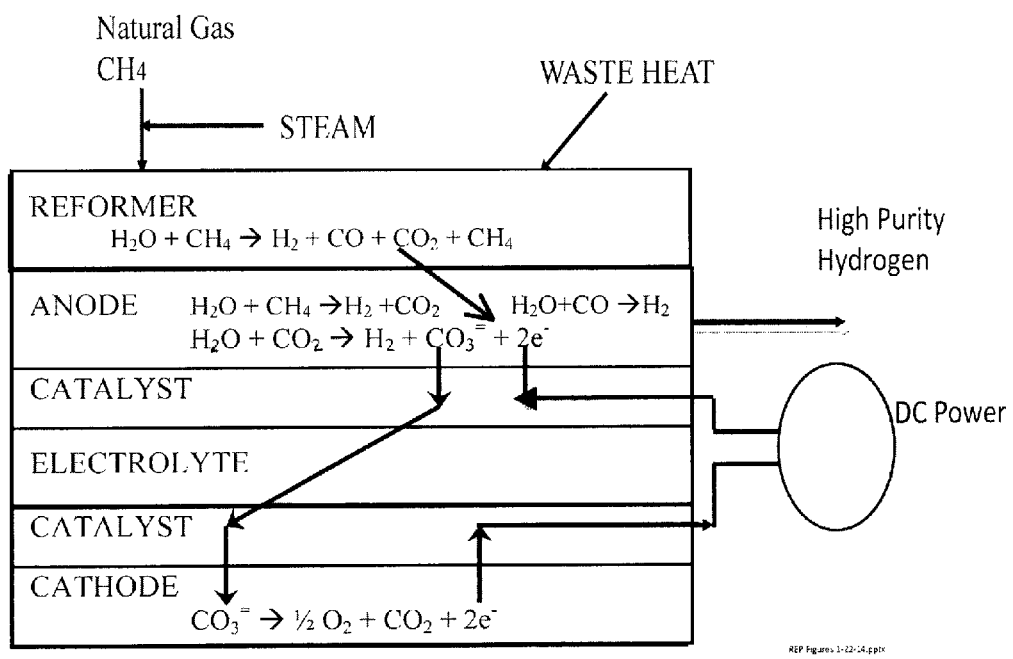
FIG. 4 shows reactions occurring in the reformer-electrolyzer-purifier (REP) assembly.

In the illustrative embodiment shown in FIG. 2, first the fuel gas is partially reformed in the reforming only cells (RU's) 202. The reaction occurring between water and methane in the RU's (reformer) is shown in FIG. 4. As shown in FIGS. 2 and 4, the partially reformed gas from the RU's 202 is then fed to the anode side 204a of an MCFC fuel cell 204 operating in purification mode as an electrolyzer (REP cells) (hydrogen producing mode). In the fuel cells 204, water is dissociated to hydrogen and oxygen, the oxygen combines with the carbon dioxide in the reformed gas to produce $CO_3^=$, and the $CO3^=$ is removed electrochemically across the molten carbonate membrane. These reactions in the anode side 204a of the fuel cell 204 are shown in FIG. 4. This operation in the fuel cell 204 removes almost all of the carbon in the system and forces the equilibrium reforming and shift reactions to essentially complete conversion of the CH4 and CO to hydrogen. Thus, as shown in FIGS. 2 and 4, the exiting hydrogen-containing gas stream is almost pure hydrogen (greater than 98%) with a small amount of $CO_2$ and CH4. This small amount of $CO_2$ and CH4 can easily be removed as the hydrogen is pressurized for systems requiring high purity hydrogen. However, many systems are able to use the low purity hydrogen directly, without the need for removing the small amount of impurities.

As shown in FIG. 2, the operation of the REP fuel cell 204 as an electrolyzer may be controlled by a controller. The controller 250 is programmed to control the supply or flow rate of reactant gases to the REP fuel cell 204. The controller 250 also controls the voltage and current applied to the fuel cell, which is supplied from the power supply (e.g., DC power supply) 230 so that the ion transfer is in the reverse direction of the normal fuel cell operation. The reactions that occur in the fuel cells of the REP system 100 are shown in FIG. 4. When a gas containing CO2 and oxygen is used as the cathode side gas, the controller 250 may further control the switching of the operation modes of the fuel cell 204 between operation as an electrolyzer and normal power production operation. This operation is described in more detail below.

Moreover, although the reforming cells 202 in FIG. 2 are shown as part of the REP fuel cell stack, so that the stack is an indirect internally reforming stack, in other embodiments, an external reformer may be used instead or in addition to the internal reforming cells for reforming the fuel.

In certain illustrative embodiments, the components used in the REP system 100 of FIG. 2 are the same or similar to the commercially available components of DFC® fuel cells developed by FuelCell Energy, Inc. By using commercially available components for the REP system, this invention can be rapidly commercialized with competitive costs, which results in further cost savings.

Figure 3A:
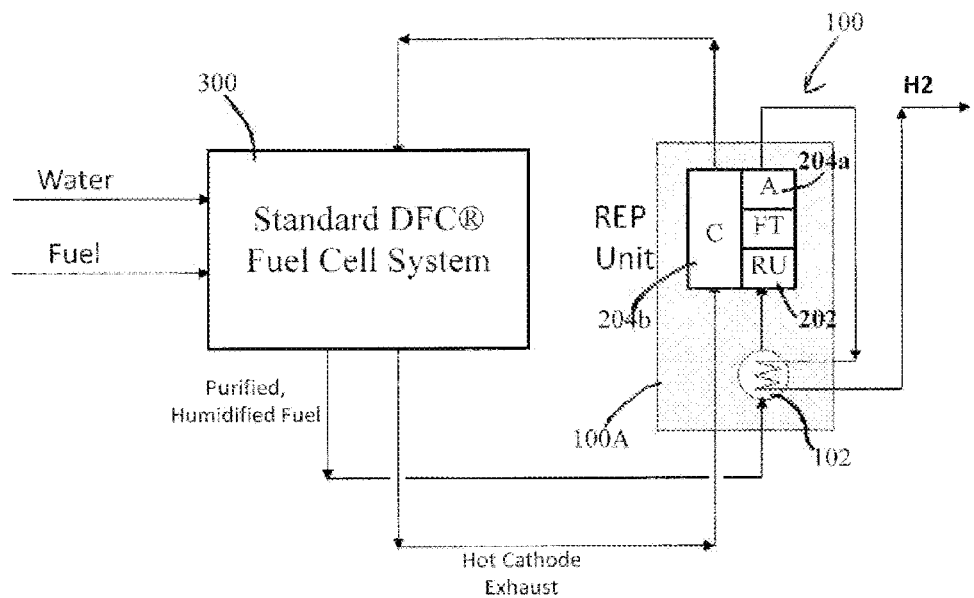
FIGS. 3A and 3B show the reformer-electrolyzer-purifier system integrated with a DFC® fuel cell system.
Figure 3B:
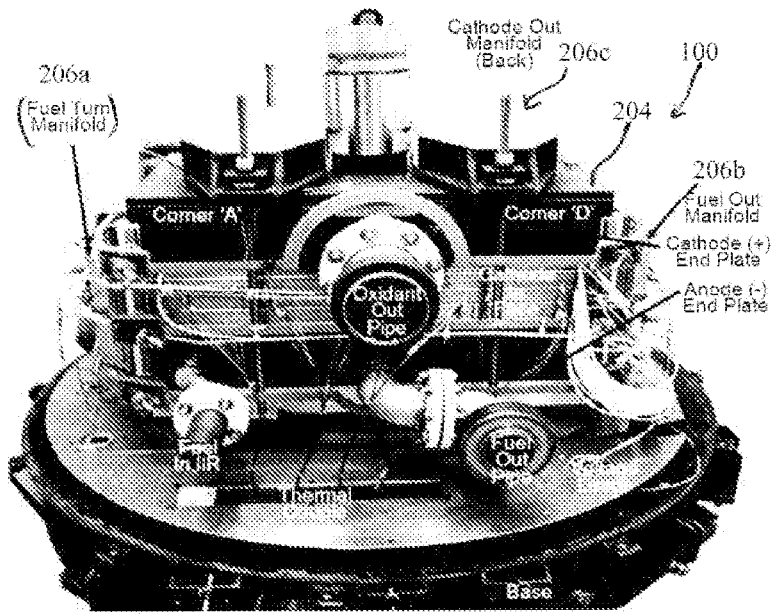

FIGS. 3A and 3B show an assembly that integrates the REP system 100 of FIGS. 1 and 2 with a high temperature fuel cell system, such as a standard DFC® fuel cell system. In the assembly shown in FIG. 3A, the high temperature fuel cell system 300 is a power producing fuel cell, which can provide the waste heat, controls, feed gas treating, water treating, power, and auxiliary support equipment to the REP system 100, thus minimizing the REP system capital cost. As shown in FIG. 3A, water and fuel are supplied to the high temperature fuel cell system 300, which also receives returning cathode exhaust from the REP system 100. Part of the purified and humidified fuel used by the standard fuel system is sent to a REP unit 100A (REP assembly) of the REP system 100. Hot cathode exhaust comprising unspent oxidant gas is also output from the high temperature fuel cell system 300 and is then supplied to the cathode side of the REP system 100 to supply heat to the REP unit 100A and a dilute the CO2 and oxygen produced by the REP unit 100A (which lowers the voltage and power requirements of the REP). Cathode exhaust output from the REP system 100 is recycled back to the high temperature fuel cell system 300 for use as oxidant in the cathode side. This recycle is enriched with CO2 and oxygen which slightly improves the performance of the standard DFC fuel cell system. As described above with respect to FIG. 2, humidified fuel supplied to the REP system is first pre-heated in a preheater 102, then conveyed to the reforming cells 202 and thereafter provided to the anode side 204a of the REP unit 100A, which comprises a fuel cell assembly operating as an electrolyzer. The anode side 204a of the REP unit 101A outputs hydrogen with a small amount of $CO_2$ and CH4. Hydrogen produced by the REP system 100 may be further purified to remove the $CO_2$ and CH4 so that high purity hydrogen can be provided to devices that operate and require high purity hydrogen, such as fuel cell cars. Such applications are described in more detail below.

FIG. 3B shows a photograph of a 30 cell DFC® stack and is similar to a possible arrangement of a 30 cell REP system 100 of FIG. 3A. The REP system 100 of FIG. 3B includes a fuel cell stack 204, positioned on a base and various connections and ports for supplying inlet gases to the stack and conveying exhaust gases out of the stack. As shown in FIG. 3B, the REP system 100 also includes a plurality of manifolds 206a-c for directing the respective inlet and outlet gases, including a fuel turn manifold 206a for directing reformed fuel to the anode side of the REP fuel cell, a fuel out manifold 206b for receiving anode exhaust (purified hydrogen), and a cathode out manifold 206c for outputting cathode exhaust. An exemplary fuel cell module which can be adapted for use in the REP system 100 of FIG. 3A is shown and described in U.S. Pat. Nos. 7,323,270 and 7,070,874, assigned to the same assignee herein and incorporated herein by reference.

Although in the illustrative embodiment of FIGS. 3A and 3B, the reforming cells 202 are shown as part of the fuel cell stack, so that the stack is an indirect internally reforming stack, in other embodiments, an external reformer may be used instead or in addition to the internal reforming cells for reforming the fuel.

As discussed above, the REP system of present invention utilizes a MCFC fuel cell operating as a high temperature electrolyzer to convert water, methane, and/or carbon monoxide in the reformed gas supplied from the reforming cells to hydrogen by removing the CO2 from the gas. In order to operate the fuel cell of the REP system as the electrolyzer, a voltage is applied to the fuel cell so that the $CO_3^=$ ions, generated from CO2 and H2O, flow is in the reverse direction of the normally occurring flow direction in fuel cells. The voltage applied to the fuel cell operating as an electrolyzer is supplied from a power supply, which may be a battery, another fuel cell or fuel cell assembly operating in a power production mode (or even fuel cells in the REP stack operating in the power production mode), or any other power storage or power supply device. The reactions in the fuel cell of the REP system require $CO_2$ and water on the anode side and generate a mixture of $CO_2$ and oxygen on the cathode side, as the $CO_3^=$ ion is pumped across the electrolyte membrane or matrix. The oxygen needed to create $CO_3^=$ is generated by the dissociation of water on the anode side. In the present illustrative embodiment, this reaction is produced by applying a reverse voltage of about 1.2V to the MCFC cell, and in the system shown in FIG. 3A, power generated by the fuel cell system 300, or portion thereof, may be used for applying the reverse voltage to the REP unit 100A. The reactions occurring in the anode side and in the cathode side of the fuel cell in the REP system, as well as the application of DC power to the anode side to drive the electrolysis reaction are shown in FIG. 4.

As discussed above, the operation of the REP system and in particular, of the fuel cell in the REP system is controlled by the controller 250 or the like. The controller 250 controls the power supply and the application of the voltage required for the electrolysis reactions in the fuel cell, as well as the flow rates of the inlet gases to the REP system. The voltage required is a function of the following Nernst equation:

$$E = E_T^o + \frac{RT}{2F}\ln\frac{X_{H_2}X_{O_2}^{1/2}X_{CO_{2(c)}}}{X_{H_2O}X_{CO_{2(a)}}} + \frac{RT}{4F}\ln P \qquad \text{Nernst Voltage Equation}$$

By configuring and controlling the REP system to dilute the cathode $CO_2$ and oxygen concentration with another gas such as air, a lower voltage and more efficient operation is realized. In the anode, at the high temperature of about 1100° F., methane is reformed by reacting with water to produce hydrogen and CO. The CO is then reacted with water to produce hydrogen and $CO_2$. Although these reactions are reversible, when the $CO_2$ is pumped out of the system, these reactions are driven towards complete or near complete conversion. The pumping out of the $CO_2$ from the system may also be controlled by the controller 250.

Theoretically pure hydrogen can be produced from the anode, but complete $CO_2$ removal is not possible due to the vapor pressure of $CO_2$ from the molten carbonate membrane and the $CO_2$ on the cathode side of the cell. Testing has shown that the $CO_2$ can be reduced to around 1% on a dry basis which can be easily removed from the hydrogen using downstream purification systems if necessary. This level of $CO_2$ is sufficient to convert essentially all the methane to hydrogen. Moreover, if a downstream purification step is used, the hydrogen and $CO_2$ ejected from a downstream purification step can easily be recycled to the REP system so that 100% conversion to hydrogen can be realized. In some embodiments, the REP system can be integrated with reactor off gases, such as the off gas from a Fischer-Tropes reactor, to facilitate recycling of hydrogen off gas from the system. Moreover, the REP system can be integrated with low temperature fuel cell systems, with power generating systems operating on coal, with a gasifier, and other systems. Specific examples of systems that use the REP system of the present invention are described below.

In the present invention, the reforming of natural gas to hydrogen is driven to completion by removal of almost all carbon from the gas being reformed. This carbon removal, in the form of $CO_3^=$, is done at high temperature so that the reforming reaction continues to completion. The power used to remove the $CO_2$ by the fuel cell of the REP system provides a double benefit to the system in that it generates additional hydrogen while purifying the hydrogen from the reforming reaction. The hydrogen generated from the electrolysis reaction in the fuel cell is highly efficient due to the high temperature and the fact that the reaction is based on steam electrolysis rather than water. It is expected that the electrolysis power requirements will be roughly 55% of the power used in low-temperature electrolysis systems per kilogram of hydrogen from electrolysis. Since up to 80% of the total hydrogen is from reforming, the power needs are roughly 11% based on total hydrogen produced.

The other important element in the present invention is the use of waste heat to drive the endothermic reforming reaction. Although one source of waste heat may be a high temperature fuel cell providing power, such as in the integrated assembly of FIG. 3, many other sources of waste heat can be used. Some of the waste heat used is relatively low temperature (approximately 250° F.) waste heat, which is used to convert the feed water into steam and to pre-heat the gases for the reforming reaction. The reforming reaction, however, requires a higher level of heat, such as is available from a high temperature fuel cell, a gas turbine, solar heat, nuclear, gasification, electrical heat or other sources.

Moreover, for systems requiring very high purity hydrogen, the low purity off gas produced can easily be recycled to the REP system to maintain a very high overall efficiency and low $CO_2$ emissions.

Figure 5A:
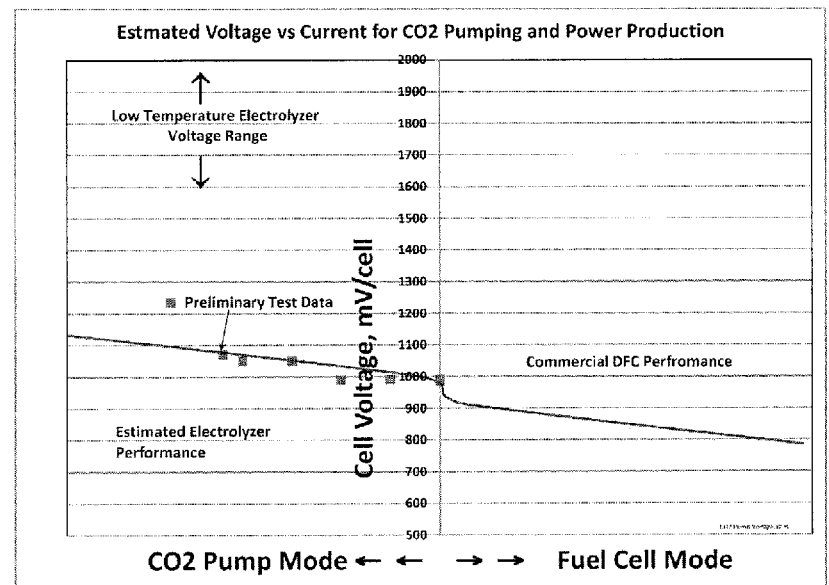
FIGS. 5A and 5B show the results of testing the reformer-electrolyzer-purifier system of FIGS. 2-3.

The REP system of the present invention was tested to determine its efficiency in terms of power consumption and purity of hydrogen produced and to compare the efficiency of the REP system to conventional electrolyzers. FIG. 5A shows a graph of test data analyzing estimated voltage required by the fuel cell of the REP system compared to conventional electrolyzers. As shown in FIG. 5A, when the fuel cell of the REP system is operated as an electrolyzer in a $CO_2$ pump mode (purification mode), the voltage needed to be applied to each cell is between 1000 and 1300 mV/cell with a voltage between 1150 and 1300 mV/cell needed to produce high purity hydrogen. In contrast, conventional low temperature electrolyzer voltage range is between 1600 and 2000 mV. Thus, this test shows that high temperature electrolysis in REP system of the present invention is much more efficient than conventional low temperature electrolyzers.

Figure 5B:
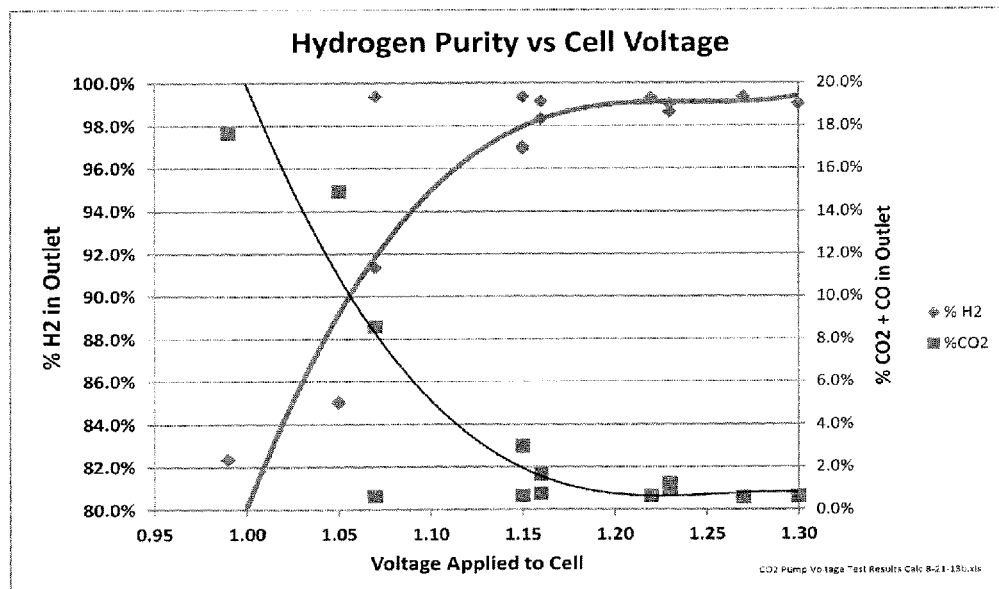

FIG. 5B demonstrates the relationship between hydrogen purity obtained in the REP system and cell voltage applied to the fuel cells of the REP system. As shown in FIG. 5B, the purity of hydrogen increases up to about 98-99% as more voltage is applied, and the amount of CO and CO2 in the gas output by the REP system decreases as the cell voltage increases. The purification of the reformed gas by the electrolysis reaction in the fuel cell multiplies the benefits of the power consumed by both producing hydrogen and purifying the reformed gas.

The present invention provides substantial improvements in hydrogen production. Because the REP system is fully scalable, it can be sized to provide the exact amount of hydrogen needed at a given site, eliminating the need for hydrogen transportation. Transportation costs can easily double or triple the cost of hydrogen at some sites and greatly increase $CO_2$ emissions due to emissions from trucks or other transportation means. Hydrogen storage is also expensive. A single high temperature stack, such as a DFC® stack, of the size currently used for power generation can produce over 1,500 kg per day of hydrogen when operated as part of the REP system. A large scale fuel-cell system typically incorporates multiple fuel cell stacks, so that, for example, a REP system using 8 fuel-cell stacks would thus produce over 12,000 kg per day of hydrogen. Thus, large, industrial scale hydrogen can be generated with the REP system of the present invention.

On the other end of the scale, the REP system will maintain efficiency even as it is scaled down. For example, a home refueling system would scale the REP system down to the 1 to 2 kg of hydrogen per day production level needed for typical fuel-cell vehicles. Such a system could potentially solve the hydrogen infrastructure problem which is a concern for these types of vehicles. As described in more detail below, an electrochemical hydrogen compression (EHC) system which compresses and purifies the H2 in one step may also be used. By combining the REP assembly and the EHC systems, the high pressure, high purity hydrogen needed by the vehicles can be easily and cost-effectively generated at this small scale.

The REP system produces a 33% oxygen/67% $CO_2$ stream in the cathode. As described in more detail below, this gas could potentially be used as the oxidant in a gasifier or even in a standard boiler to produce a high purity $CO_2$ stream for capture. Even without $CO_2$ capture, the use of this gas as the oxidant in place of air would eliminate NOx formation. In some cases, this stream can be diluted with air or cathode exhaust gas so that the composition of the gas on the cathode side is similar to the composition used in commercial DFC® power generation cells developed by FuelCell Energy, Inc. This dilution helps maintain the heat balance in the system and reduces the voltage requirement on the cell. Nevertheless, the system of the present invention makes CO2 capture practical. Examples of systems incorporating the REP and providing CO2 capture are described in more detail below.

As discussed above, the REP system also incorporates a high temperature electrolyzer which is much more efficient than current low temperature technology, using only approximately 55% of the conventional power. This electrolyzer could be run without any fuel when integrated with a high temperature fuel cell system, such as a DFC® fuel-cell, to efficiently store excess electrical power as hydrogen.

Figure 6:
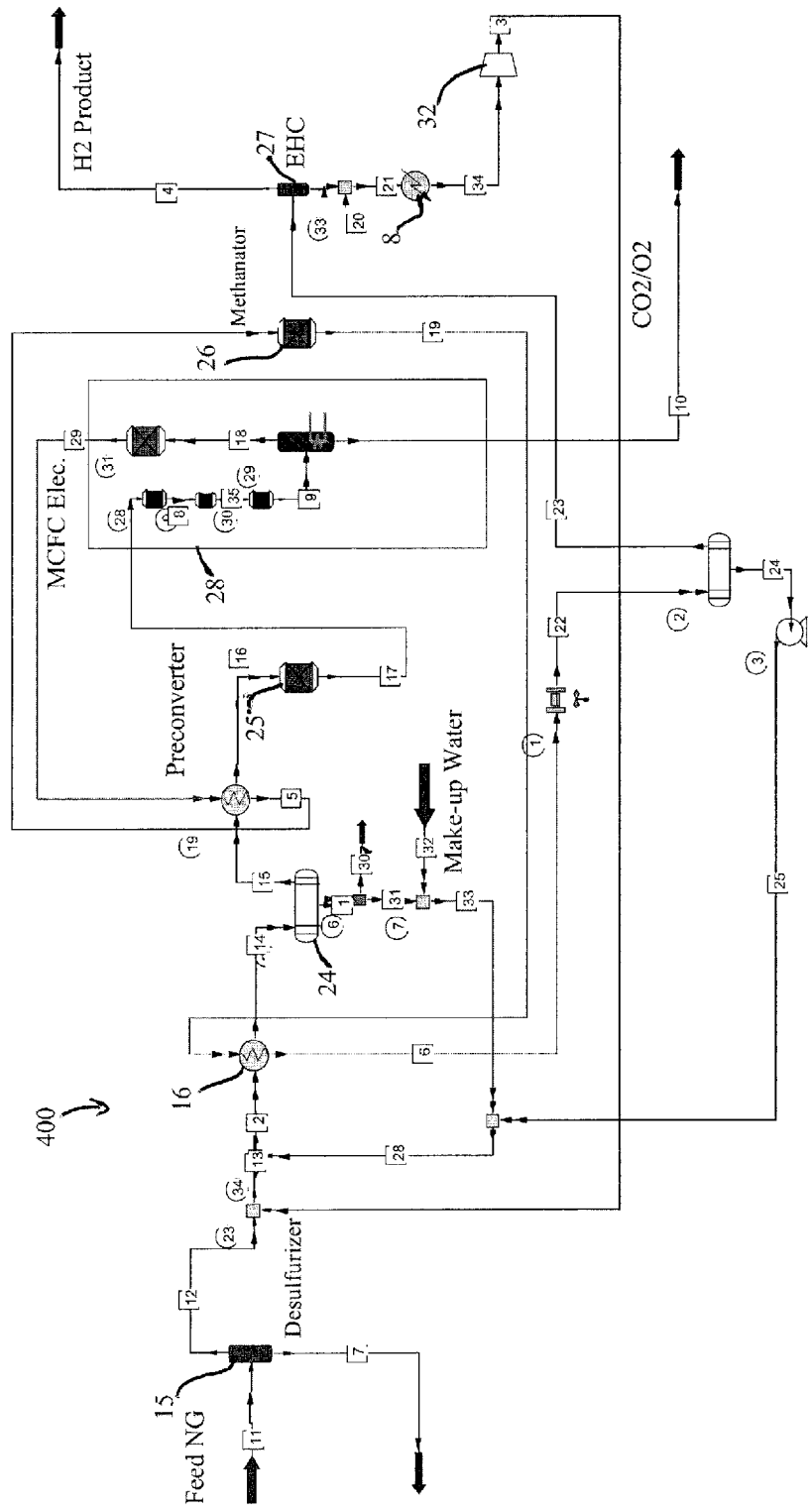
FIG. 6 shows an embodiment of a hydrogen production system that utilizes molten carbonate fuel cell based reformer-electrolyzer-purifier assembly and is followed by electrochemical hydrogen compression to produce high pressure, pure hydrogen.

FIG. 6 shows another embodiment of a hydrogen production system 400 that utilizes the REP system followed by an electrochemical hydrogen compression (EHC) to produce high pressure high purity hydrogen in order to produce a high pressure high purity H2. As shown in FIG. 6, the system 400 includes a desulfurizer 15 for desulfurizing fuel supplied to the system, a pre-heater/humidifier 16 for pre-heating desulfurized fuel, and humidifying desulfurized fuel with water, a further pre-heater 19, a preconverter or reformer 25 for reforming humidified fuel, a fuel cell REP stack 28 operating as a high temperature electrolyzer, a methanator 26 and an electrochemical hydrogen compression (EHC) system 27. In FIG. 6, fuel is desulfurized in the desulfurizer 15, mixed with water or humidified in the humidifier 16, pre-heated using one or more pre-heaters 16, 19 and fed to the preconverter (reformer) 25 to convert methane and water in the fuel to $H_2$ and $CO_2$ via the following reaction:

$$CH4+2H_2O \rightarrow 4H2+CO2 \qquad (1)$$

Heat from an external source (not shown) is added into the preconverter 25. The reformed fuel comprising hydrogen and CO2 is then conveyed to an anode side of the REP fuel cell stack 28 operating as a high temperature electrolyzer (CO2 pump). In the REP fuel cell stack 28, CO2 in the fuel is removed by electrolyzing additional water to produce more H2 via the following reaction:

$$(2)$$

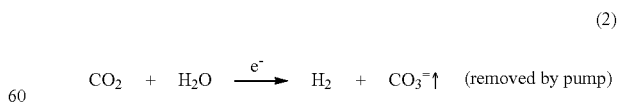

The removal of the CO2 from the hydrogen-containing gas generated in the REP stack drives the CH4 conversion to near completion and a 95-99% H2 stream is generated from the fuel cell stack 28. The resulting hydrogen-containing gas stream output from the fuel cell stack 28 is cooled slightly in the heat exchanger 19, which also pre-heats humidified fuel, and then conveyed to the methanator 26 where the gas is methanated. In the methanator 26, all traces of CO are removed from the gas by converting it to CH4 so that a 98% H2/2% CH4 stream with 0% CO2 and CO is produced.

After the methanation process, the resulting converted hydrogen-containing stream (98% H2/2% CH4) is conveyed to the electrochemical hydrogen compression (EHC) system 27, which is used to compress the H2 from near atmospheric pressure to 2000+ psig. At the same time, the EHC system 27 purifies the H2 to 99.9+ % needed for certain uses, such as in a fuel cell vehicle. The left over gas from the EHC system 27 comprising methane, H2 and H₂O is cooled in a heat exchanger 8 and then recycled back to the supply feed using a blower 32. In this way, 100% of the CH4 is converted to H2 and 100% of the H2 generated is eventually exported as a final product H2 having purity of >99.9% and compressed at >2000 psig pressure.

A material balance for the system shown in FIG. 6 is shown below:

| H2 Demand | | |
|---|---|---|
| Tot kw | 7.43 | $0.45 $/D pwr |
| Tot mmbtu | 33,028 | $0.33 $/D NG |
| | | $1.71 $/kg H2 Op Cost |

As shown, this operating cost includes H2 generation, purification, and compression to 2000+ psig.

The system of FIG. 6 can be used as a hydrogen fuel fueling system that efficiently generates H2 from natural gas and/or other fuels using the fuel cell system operated in reverse (REP assembly). This hydrogen fuel fueling system can be used for providing H2 fuel to fuel cell cars and small industrial uses with significantly lower production costs. Although the capital and maintenance costs of H2 production will increase the total cost of the H2 production, this total cost of H2 is still economically attractive since current

| Stream No. | 11 | | 3 | | 15 | | 16 | | 17 | |
|---|---|---|---|---|---|---|---|---|---|---|
| 236 Name | Feed NG | | Recycle | | Wet NG to RU | | RU in | | RU Out | |
| Molar flow lbmol/hr | 100.00 | | 148.27 | | 739.33 | | 739.33 | | 864.30 | |
| Mass flow lb/hr | 1,604.3 | | 578.0 | | 11,028.9 | | 11,028.9 | | 11,028.9 | |
| Components | lb-mole/hr | mole % | lb-mole/hr | mole % | lb-mole/hr | mole % | lb-mole/hr | mole % | lb-mole/hr | mole % |
| Hydrogen | 0.00 | 0.00 | 129.47 | 87.32 | 129.47 | 17.51 | 129.47 | 17.51 | 361.64 | 41.84 |
| Methane | 100.00 | 100.00 | 11.00 | 7.42 | 111.00 | 15.01 | 111.00 | 15.01 | 48.51 | 5.61 |
| Carbon Monoxide | 0.00 | 0.00 | 0.00 | 0.00 | 0.00 | 0.00 | 0.00 | 0.00 | 17.77 | 2.06 |
| Carbon Dioxide | 0.00 | 0.00 | 0.00 | 0.00 | 0.00 | 0.00 | 0.00 | 0.00 | 44.72 | 5.17 |
| Water | 0.00 | 0.00 | 7.80 | 5.26 | 498.87 | 67.47 | 498.87 | 67.47 | 391.67 | 45.32 |
| Nitrogen | 0.00 | 0.00 | 0.00 | 0.00 | 0.00 | 0.00 | 0.00 | 0.00 | 0.00 | 0.00 |
| Oxygen | 0.00 | 0.00 | 0.00 | 0.00 | 0.00 | 0.00 | 0.00 | 0.00 | 0.00 | 0.00 |
| Total | 100.00 | 100.00 | 148.27 | 100.00 | 739.33 | 100.00 | 739.33 | 100.00 | 864.30 | 100.00 |

| Stream No. | 10 | | 29 | | 19 | | 23 | | 4 | |
|---|---|---|---|---|---|---|---|---|---|---|
| 236 Name | CO2/O2 | | MCFC Raw H2 | | Meth Out | | EHC In | | H2 Product | |
| Molar flow lbmol/hr | 158.93 | | 841.44 | | 839.33 | | 666.14 | | 517.87 | |
| Mass flow lb/hr | 6,286.6 | | 4,742.3 | | 4,742.3 | | 1,622.0 | | 1,043.9 | |
| Components | lb-mole/hr | mole % | lb-mole/hr | mole % | lb-mole/hr | mole % | lb-mole/hr | mole % | lb-mole/hr | mole % |
| Hydrogen | 0.00 | 0.00 | 650.86 | 77.35 | 647.32 | 77.12 | 647.34 | 95.21 | 517.87 | 100.00 |
| Methane | 0.00 | 0.00 | 9.95 | 1.18 | 11.00 | 1.31 | 11.00 | 1.62 | 0.00 | 0.00 |
| Carbon Monoxide | 2.06 | 0.00 | 0.68 | 0.08 | 0.00 | 0.00 | 0.00 | 0.00 | 0.00 | 0.00 |
| Carbon Dioxide | 100.00 | 62.92 | 0.38 | 0.04 | 0.00 | 0.00 | 0.00 | 0.00 | 0.00 | 0.00 |
| Water | 0.00 | 0.00 | 179.58 | 21.34 | 181.01 | 21.57 | 21.57 | 3.17 | 0.00 | 0.00 |
| Nitrogen | 0.00 | 0.00 | 0.00 | 0.00 | 0.00 | 0.00 | 0.00 | 0.00 | 0.00 | 0.00 |
| Oxygen | 58.93 | 37.08 | 0.00 | 0.00 | 0.00 | 0.00 | 0.00 | 0.00 | 0.00 | 0.00 |
| Total | 158.93 | 100.00 | 841.44 | 100.00 | 839.33 | 100.00 | 679.91 | 100.00 | 517.87 | 100.00 |

The operating cost for the above-described system of FIG. 6, assuming $0.06/kwh for power and 10$/mmbtu for natural gas, is estimated at $1.71/kg of H2 produced, including compression power. Costs can range from $1.18/kg with $5 gas and $0.06 power to $2.84/kg with $12 gas and $0.12 power. Maintenance and capital costs are in addition to these operating costs. The operating costs of the system of FIG. 6 are summarized as follows:

| H2 Demand | |
|---|---|
| | 1.00 lb/day |
| CO2 Pump | 3.25 kw/day needed |
| EHC | 4.18 kw/day needed |
| Recycle | 0.0233 kw/day needed | small-scale hydrogen is typically greater than $5 per kilogram. Moreover, the efficient generation of H2 on site would help solve infrastructure problems with providing H2 fuel to fuel cell cars and for small industrial uses.

As discussed above, the systems and embodiments described above provide an improved and most efficient systems for production of high purity hydrogen, which greatly reduce the cost of hydrogen production for use in cars and in industrial processes. Moreover, the systems and embodiments described above reduce CO2 emissions produced as a result of fuel reforming.

The REP systems and the REP assembly described above with respect to FIGS. 1-6 may be incorporated into a variety of systems to provide hydrogen generation, efficient power storage, fuel purification, CO2 removal and CO2 capture. Illustrative configurations of such systems and uses are described herein below.

In the illustrative configurations described below, each system includes a REP assembly that includes at least one REP stack, the configuration and operation of which are described above. Specifically, as described herein above, the at least one REP stack includes at least one electrolyzer fuel cell with an anode side and a cathode side separated by an electrolyte matrix, and the REP assembly also includes a power supply, such as a DC power supply, for supplying the necessary reverse voltage to the REP stack to facilitate the reactions therein. As described above, water and carbon dioxide are electrochemically reacted in the anode side of the at least one electrolyzer fuel cell to produce hydrogen and $CO_3^=$ ions, and $CO_3^=$ ions are conveyed across the electrolyte matrix to the cathode side of the electrolyzer fuel cell(s) upon application of the reverse voltage. The removal of $CO_3^=$ ions from the anode side drives the reaction between water and carbon dioxide to completion. Other reactions that may occur in the anode side of the electrolyzer fuel cell(s) are between water and methane to produce hydrogen and carbon dioxide, and an internal shift reaction between water and carbon monoxide to produce hydrogen. In the cathode side of the electrolyzer fuel cell(s), $CO_3^=$ ions are converted to oxygen and carbon dioxide. These reactions are shown in FIG. 4.

Use of REP Assembly with Steam Methane Reforming for CO2 Capture

The REP assembly of the present invention can be used with a reformer for efficiently capturing CO2 output from the reformer. Conventionally, steam methane reformers are one of the largest emitters of CO2 in refinery operations, and the CO2 output from such reformers is not captured. Therefore, there exists a need for efficiently capturing CO2 output from refinery and other steam methane reforming operations.

In conventional steam methane reformer configurations, steam and natural gas are fed to a reformer, where methane is converted to hydrogen and CO, and reformer effluent is then cooled and the CO is shifted to hydrogen. In such conventional systems, the shifted gas is sent to a pressure swing adsorption (PSA) system where the hydrogen is separated from the residual methane and CO in the gas and from the CO2 produced as a result of the reforming reaction. The residual gases comprising methane, CO, and CO2 are then used as fuel to the reformer and are combusted with air to provide heat needed for the endothermic reforming reaction in the reformer. The CO2 generated from the reforming reactions is vented from the reformer as flue gas. As a result of these conventional reforming operations, steam methane reforming is the largest CO2 emitter in a refinery and emits about 11,000 g of CO2 per gallon gasoline equivalent (gge) of H2.

The present invention utilizes the REP assembly similar to those shown in FIGS. 1, 2 and 4 and described above, in combination with a reformer for capturing CO2 generated by the reformer. In the CO2 capturing system of the present invention, the reformer receives natural gas and steam and reforms the natural gas into hydrogen. The outlet of the reformer is not cooled but is instead fed directly to the REP assembly, which comprises a MCFC fuel cell stack operated in reverse and a power supply. In the REP assembly, the residual methane and CO are converted to hydrogen and CO2, which is pumped across the fuel cell membrane so that the CO2 is removed electrochemically at a high temperature. As discussed above, the reaction is pushed close to completion due to the removal of the CO2 across the membrane and the REP assembly outputs a hydrogen-containing gas effluent that is 98% hydrogen, which can be further purified. CO2 is also output from the REP assembly and can be captured or used in a device that receives oxidant gas, such as an anode gas oxidizer (AGO).

Figure 7:
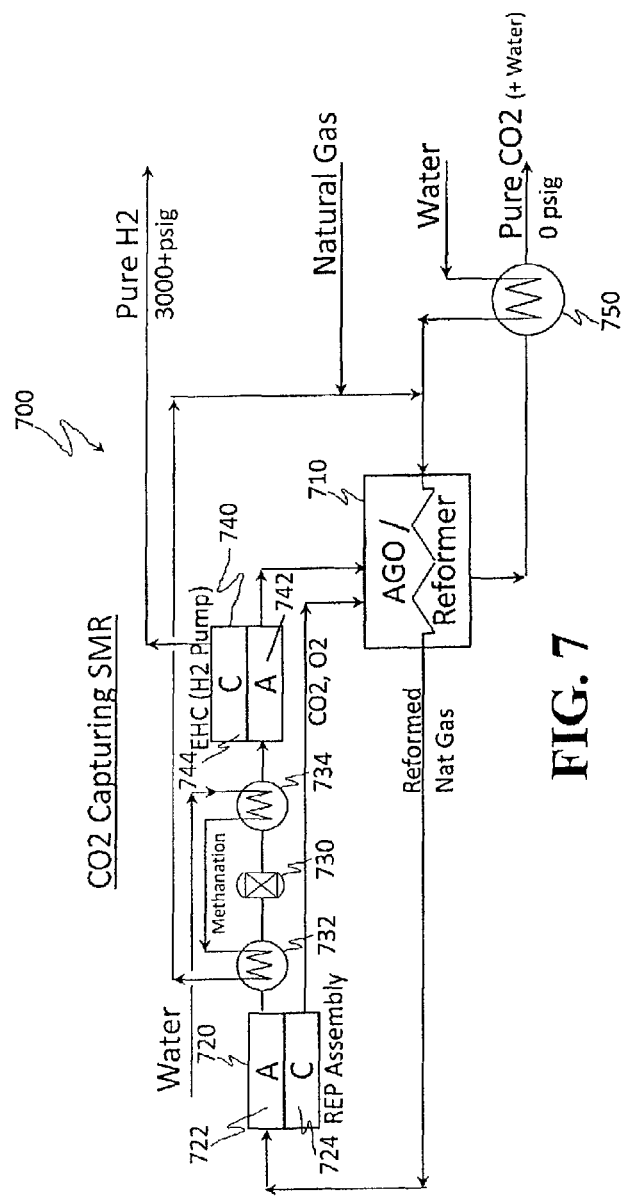
FIG. 7 shows an illustrative configuration of the CO2 capturing system that combines a reformer with the REP assembly of the present invention.

FIG. 7 shows an illustrative configuration of the CO2 capturing system 700 that combines a reformer 710 with the REP assembly 720, also referred to as a CO2 pump. The CO2 capturing system 700 also includes a methanator 730, EHC (a hydrogen pump) 740 which is an electrochemical hydrogen compressor, and heat exchangers 732, 734 and 750. As shown in FIG. 7, natural gas and water in the form of steam are supplied to the reformer 710 where natural gas is reformed to produce reformed gas comprising hydrogen and CO. The reformed gas output from the reformer 710 is output directly to an anode side of the $CO_2$ pump/REP assembly 720 as a supply gas mixed with steam, and in the CO2 pump/REP assembly 720, the residual methane in the reformed gas is converted to hydrogen and $CO_2$, which is pumped across the membrane of the $CO_2$ pump 720. Specifically, in the $CO_2$ pump/REP assembly 720, the $CO_2$ is reacted with water to create $CO_3^=$, which is removed by the pump/REP assembly according to the following reaction:

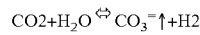

This reaction is the same as reaction (2) described above, and is driven forward by the electrochemical removal of the $CO_3^=$ ions across the matrix membrane so that near pure hydrogen (~98+ %) is generated. While the $CO_2$ is removed, almost all of the feed methane is converted to hydrogen. The other reactions that occur in the $CO_2$ pump/REP assembly are described above and shown in FIG. 4.

The CO2 pump/REP assembly 720 outputs from its anode side the generated hydrogen-containing gas (about 98% purity hydrogen), which is then purified. The hydrogen-containing gas output from the $CO_2$ pump/REP assembly 720 is cooled in a heat exchanger 732 and thereafter conveyed to the methanator 730. In the methanator 730, all of the residual CO and $CO_2$ in the hydrogen gas are converted back to methane. It is important to remove all of the CO in the gas so that the power requirement of the $H_2$ pump/EHC 740 is minimized. The methanator 730 outputs converted hydrogen-containing gas comprising a mixture of hydrogen (98%) and methane, which is cooled in the heat exchanger 734. As shown in FIG. 7, the heat exchangers 732 and 734 may be used to pre-heat water supplied to the system 700 using the heat in the generated hydrogen-containing gas and methanator output gas to produce the steam required for the reforming reaction in the reformer 710. The cooled converted hydrogen-containing gas comprising the mixture of hydrogen and methane is then conveyed to the H2 pump 740, which uses electrochemical hydrogen compression (EHC) to compress and purify the hydrogen. As shown in FIG. 7, the hydrogen and methane mixture is received in an anode side 742 of the H2 pump/EHC 740, and hydrogen is pumped across a membrane to a cathode side 744 of the H2 pump/EHC 740 so as to separate it from the methane Pure compressed hydrogen is output from the cathode side of the H2 pump/EHC 740, while the methane is separately output from the anode side 742. By using the H2 pump with the EHC, hydrogen can be purified to over 99% purity and output at high pressure of 2,000 psig or greater, suitable for storage or for use in devices that operate on high purity hydrogen.

As also shown, the $CO_2$ pump/REP assembly 720 generates and separately outputs an oxidant gas comprising a mixture of about 2/3 carbon dioxide and 1/3 oxygen by transferring electrochemically the $CO_3^=$ ion across the high temperature membrane. This CO2/O2 mixture can be used in place of air in the reformer 710, which in the illustrative embodiment of FIG. 7 includes an anode exhaust oxidizer. The anode exhaust oxidizer of the reformer 710 also receives methane and unrecovered hydrogen output from the cathode of the H2 pump/EHC and oxidizes the methane and unrecovered hydrogen with the $CO_2/O_2$ mixture while producing heat needed for the reforming reaction in the reformer. By replacing the air with the $CO_2/O_2$ mixture from the $CO_2$ pump/REP assembly 720, essentially all of the methane and unrecovered hydrogen are used as fuel to provide the heat for the reformer and are converted to $CO_2$ and water. Flue gas output from the oxidizer is essentially pure $CO_2$ after it is cooled in the heat exchanger 750 and water is condensed out from the flue gas. The cooled $CO_2$ gas can then be compressed so that all of the $CO_2$ from the system 700 can be captured and sequestered without further purification. As shown in FIG. 7, heat recovered from the flue gas in the heat exchanger 750 is used for heating water to produce steam for the reforming reaction.

The system 700 in FIG. 7 has several advantages over the conventional reforming system. As described above, the CO2 produced by the system 700 is high purity and is ready for capturing. Moreover, since no nitrogen is present in the reactions, no NOx is produced or emitted from the system 700. The hydrogen produced by the system is high purity (>99%) and is at a high pressure of 3000 psig or greater, and due to the high conversion of methane to hydrogen, the system 700 remains in heat balance without requiring excess heat to be converted to steam or other byproducts. Further, the system 700 is scalable from a small home system that produces 1 kg of hydrogen per day to a larger system producing 10,000+ kg of hydrogen per day. In addition, the equipment used in the system 700 is similar to the equipment currently used for MCFC fuel cells and thus, readily available. Another advantage of the system 700 of FIG. 7 is a reduction in the fuel consumption by the system because about 20% of the hydrogen produced is from the water-CO2 electrolysis reaction. Moreover, the system can be operated to load follow, if needed, to meet the hydrogen demand, or can be used to load follow to help balance the power requirements of the area.

In the illustrative configuration of the system 700 in FIG. 7, the hydrogen generated in the CO2 pump/REP assembly 720 is purified using the methanator 730 and the H2 pump 740. However, the system 700 may be modified to instead use PSA-based polishing systems for separating the hydrogen from the other constituents in the gas generated by the CO2 pump/REP assembly. In such a modified system, the methanator is not required before the gas is provided to the PSA-based polishing system. The advantages of the modified system are the same as those of the system 700 shown in FIG. 7.

PEM Power Generation from Natural Gas Using H2 Generated in REP Assembly

The REP assembly of the present invention may also be used to provide low cost H2 for PEM power generation on site and at remote locations. PEM fuel cells operate on high purity H2, and conventionally require high cost steam methane reforming systems or stored hydrogen sources. However, in the present invention, the REP assembly efficiently generates hydrogen at low cost for use in PEM based power generation systems.

FIGS. 8A-8F show illustrative configurations of hydrogen generation systems 800, each of which includes a REP assembly 810 that generates hydrogen for use in one or more PEM power generation systems 820. The illustrative systems of FIGS. 8A-8F also include a reformer 830 for partially reforming fuel, such as natural gas, with water in the form of steam, and high level heater 840, such as an AGO, that generates high level heat for the reformer 830.

As shown in FIGS. 8A-8F, fuel such as natural gas and water are pre-heated in a heat exchanger 850 using low level waste heat, which can be from an outside source, so as to vaporize the water. The resulting mixture of steam and fuel is then conveyed to the reformer 830 where the fuel is partially reformed using the high level heat provided by the high level heater 840. The high level heater 840, which can be an AGO, receives oxidant gas and a slipstream of fuel and burns or oxidizes the fuel to generate high level heat for the reforming reaction in the reformer 830. The partially reformed fuel output from the reformer is then fed to an anode side 812 of the REP assembly 810, which produces a hydrogen-containing gas stream with greater than 95% purity. The REP assembly 810 comprises a MCFC fuel cell stack that is operated in reverse as an electrolyzer, and has the same or similar construction and operation as the REP assembly described above. The REP assembly also includes a power supply for applying a reverse voltage to the fuel cell stack. The REP assembly 800 also separately outputs from a cathode side 814 an oxidant gas comprising a CO2/O2 mixture produced as a result of the result of the reactions in the REP assembly 800. The reactions occurring in the REP assembly 800 are described above and shown in FIG. 4.

In the systems of FIGS. 8A-8F, hydrogen-containing gas stream generated by the REP assembly 800 is cooled and may be processed, and thereafter fed to one or more PEM power generation system 820, or PEM fuel cells. During or after the cooling process, the partially cooled hydrogen-containing gas is contacted with a reforming catalyst which converts all of the CO and CO2 in the hydrogen gas stream to methane and water, so that a mixture of over 95% hydrogen and less than 5% methane and less than 1 ppm CO is conveyed to an anode side 822 of the one or more PEM power generation systems 820. In the illustrative configurations of FIGS. 8A-8F, a blow down from the anode side 822 of the PEM fuel cell(s) is used to keep the methane concentration in the fuel cell low. Specifically, anode exhaust gas including methane and hydrogen output from the anode side 822 of the PEM fuel cell(s) is recycled back to the reforming system via an anode exhaust recycle path 826 and mixed with the fuel and water input into the system so that 100% of the fuel is utilized and the concentration of methane in the fuel gas provided to the anode side 822 of the PEM fuel cell(s) is low. A blow down assembly 825 is provided in the recycle path in order to keep the methane concentration low in the PEM fuel cell.

The configurations of FIGS. 8A-8F differ mainly in the way air is provided to the system 800, the way the CO2/O2 mixture output from the REP assembly 810 is utilized, provision of CO2 capture and/or provision of hydrogen storage. The different configurations of the system 800 in FIGS. 8A-8F will now be described.

Figure 8A:
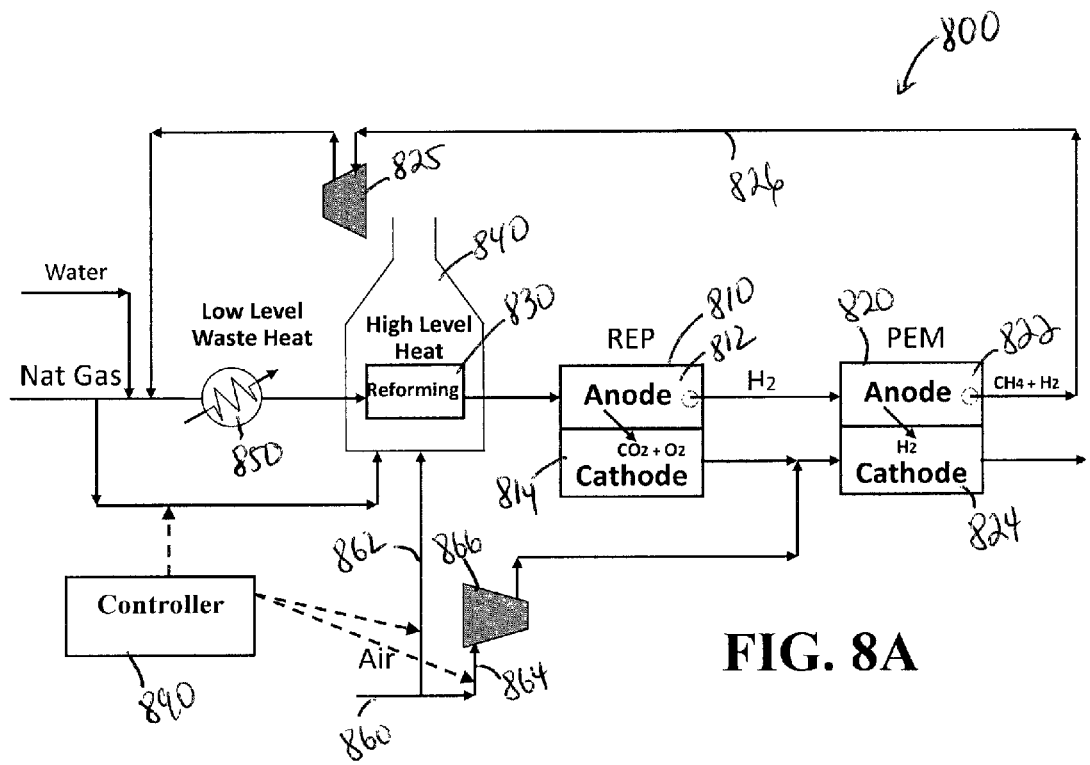
FIGS. 8A-8F show illustrative configurations of hydrogen generation systems, each of which includes the REP assembly that generates hydrogen for use in one or more PEM power generation systems.

In FIG. 8A, air 860 supplied to the system 800 is used in the high level heater 840 and in the PEM power generation system 820. As shown, a first portion of air 862 is conveyed to the high level heater 840 for burning with the slipstream of the fuel, and a second portion of air 864 is conveyed to a cathode side 824 of the PEM power generation system 820. A blower 866, or a similar device, may be used for supplying the second air portion 864 to the cathode side 824 of the PEM power generation system 820.

As shown in FIG. 8A, no air is fed to the cathode side 814 of the REP assembly 810. Although this configuration requires more power for operating the REP assembly 810, the REP assembly 810 outputs from the cathode side 814 an oxidant gas with more than 30% oxygen, which is then conveyed to the cathode side 824 of the PEM power generation system 820 along with the second air portion. The supply of this enriched oxidant gas to the PEM power generation system 820 increases the operating performance of the PEM power generation system 820. In the illustrative configuration of FIG. 8A, cathode exhaust output from the cathode side 824 of the PEM power generation system 820 is vented out of the system 800.

Figure 8B:
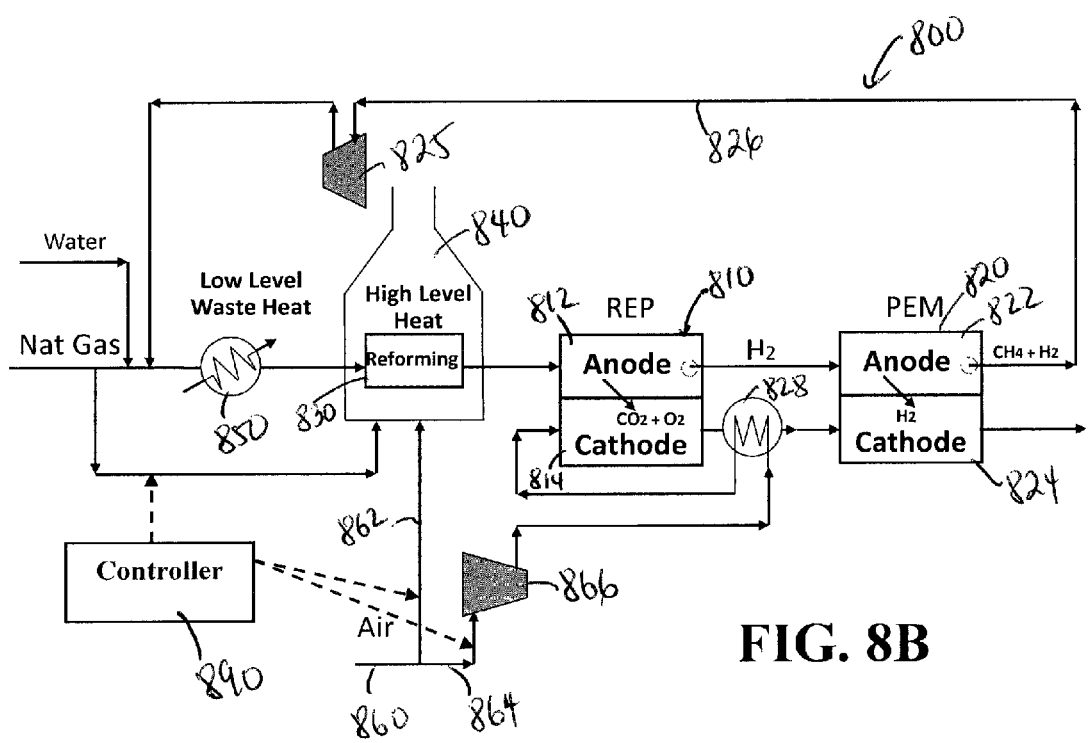

FIG. 8B shows a similar configuration to that of FIG. 8A, but the second air portion 864 is conveyed to the cathode side 814 of the REP assembly 810 instead of being provided directly to the cathode side 824 of the PEM power generation system 820. All of the components that are similar and have similar functions are labeled with like reference numbers and detailed description thereof is omitted. As shown in FIG. 8B, the second portion of air 864 is pre-heated in a heat exchanger 828 using heat in the oxidant exhaust output from the cathode side 814 of the REP assembly 810, and the pre-heated second air portion is then conveyed to the cathode side 814 of the REP assembly 810. This illustrative configuration reduces the power consumption of the REP assembly 810 due to the lower voltage required, but requires the addition of a heat exchanger.

Figure 8C:
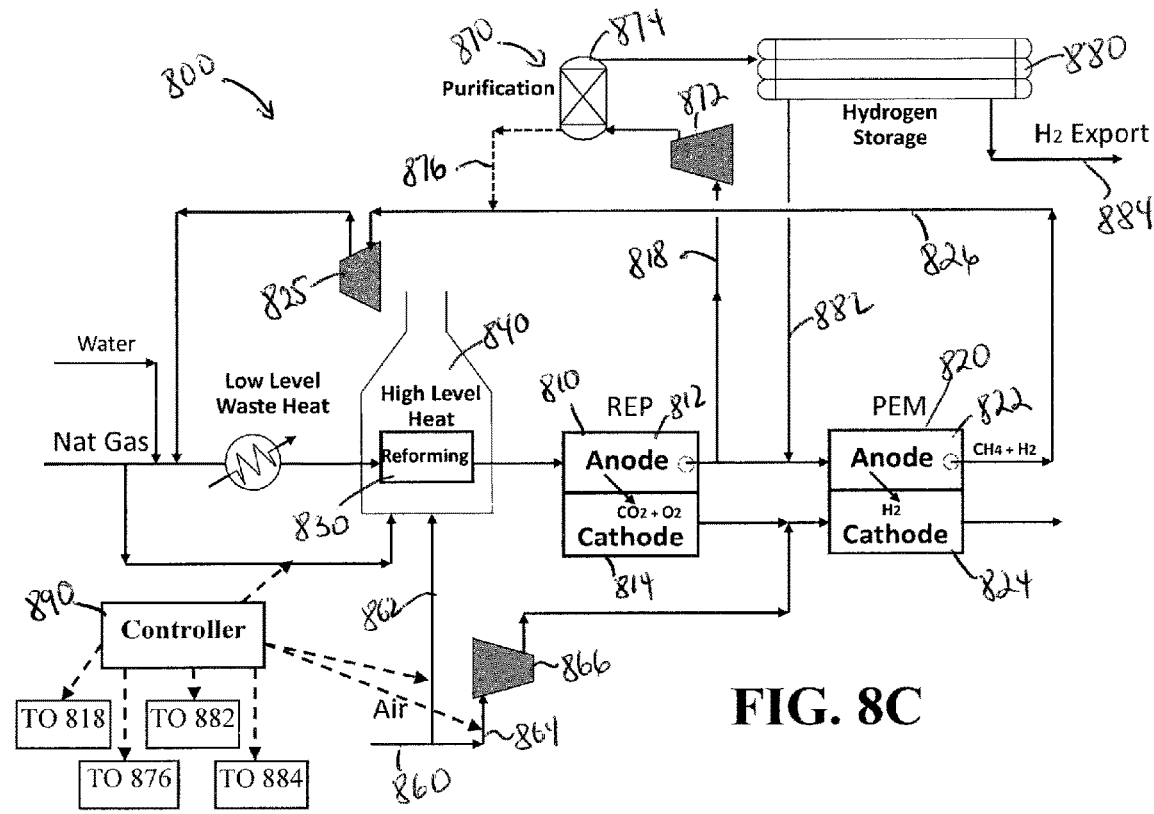

The systems of FIGS. 8A-8B can be readily configured to operate as a peaking system by adding hydrogen storage. FIG. 8C shows an illustrative configuration of the system 800 of FIG. 8A configured as a peaking system with hydrogen storage. All of the components that are similar and have similar functions are labeled with like reference numbers and detailed description thereof is omitted.

In FIG. 8C, the system 800 includes a hydrogen purification assembly 870 for compressing and purifying all or a portion of the hydrogen-containing gas generated by the REP assembly 810 and a hydrogen storage assembly 880 for storing the purified and compressed hydrogen output from the hydrogen purification assembly 870. The system 800 of FIG. 8C allows the REP assembly 810 to be operated continuously so as to continuously generate the hydrogen-containing gas, while the PEM energy generation system 820 and the hydrogen storage assembly 880 may be operated based on external power demand Specifically, the hydrogen-containing gas produced by the REP assembly 810 can be stored in the hydrogen storage assembly 880 or converted directly into power in the PEM energy generation system 820 depending on the external power demand for the PEM energy generation system 820. In addition, the amount of hydrogen-containing gas conveyed to the PEM energy generation system 820 and the amount of hydrogen-containing gas conveyed to the hydrogen storage assembly 880 is controlled by a controller 890 based on the operating conditions of the PEM energy generation system 820 and/or the power demands on the PEM energy generation system 820.

As shown in FIG. 8C, all or a portion of the hydrogen-containing gas output from the REP assembly 810 can be conveyed to the PEM energy generation system 820 for generating power and/or to the hydrogen purification assembly 870 where the hydrogen-containing gas is compressed using a compressor 872 and thereafter hydrogen purified in a purification device 874 such as a PSA (pressure swing adsorber) or EHC. If an EHC is used as a compressor 872, further purification may not be required. After the hydrogen-containing gas is compressed in the compressor 872, purification in the purification device 874 is relatively easy to accomplish due to the low level of contaminants in the gas. The purified pressurized hydrogen gas output from the purification device 874 is then conveyed to the hydrogen storage assembly 880 for storage for future use in the PEM power generation assembly 820 during peak power generation and/or for export to outside devices. If the hydrogen is not exported, purification may not be required. Although not shown in FIG. 8C, a hydrogen expander may be provided for expanding pressurized hydrogen conveyed from the hydrogen storage to the PEM power generation system 820 so as to recover some of the energy used for compressing the hydrogen for storage in the storage assembly 880.

As shown in FIG. 8C, the system also includes a hydrogen bypass path 876 for conveying the impurities from the purification device 874 to a PEM anode exhaust recycle path 826 which recycles the anode exhaust produced by the PEM power generation system 820 for use in the reformer 830. As discussed above, the system 800 also includes the controller 890 for controlling the operation of the system 800 and in particular, for controlling the use and routing of the hydrogen-containing gas generated by the REP assembly 810. Specifically, the controller 890 controls the amount of the hydrogen-containing gas conveyed from the REP assembly 810 to the PEM power generation system 820, the amount of the hydrogen-containing gas conveyed from the REP assembly 810 to the hydrogen purification assembly 870, the amount of purified hydrogen conveyed from the hydrogen purification assembly 870 to the hydrogen storage assembly 880, the amount of hydrogen conveyed from the hydrogen storage assembly 880 to the PEM power generation system 820 and the amount of hydrogen exported from the hydrogen storage assembly 880. These controls are based on a number of factors, including the operating mode of the REP assembly and of the PEM power generation system, the external power demand on the PEM power generation system, the capacity of the hydrogen storage assembly, and the composition of the fuel feed. Thus, for example, when the external power demand is low and/or when the PEM power generation system is producing no or low power, the controller 890 controls a larger amount of the hydrogen-containing gas, or all of the hydrogen-containing gas, produced by the REP assembly to be conveyed to the hydrogen purification assembly 870 and to be stored in the hydrogen storage assembly 880. However, when the power demand is high, such as during peak power operation of the PEM power generation assembly 820, the controller 890 controls all or a larger portion of the hydrogen-containing gas generated by the REP assembly to be conveyed to the anode side 822 of the PEM power generation system 820 with little or no hydrogen-containing gas being conveyed to the hydrogen purification assembly 870. During such high power demand, the controller 890 may also control hydrogen to be conveyed from the hydrogen storage assembly 880 to the PEM power generation system 820 so as to generate additional power. Moreover, when the storage capacity of the hydrogen storage assembly 880 becomes low, the controller 890 may control hydrogen to be exported from the hydrogen storage assembly 880 and/or to be provided to the PEM power generation system 820. It is further contemplated that the same controller 890 or another control device also controls the amount of air provided with the first air portion 862 to the high level heater 840 and the amount of air provided with the second air portion 864 to the cathode side 824 of the PEM power generation system 820. A similar controller may be provided in the systems shown in FIGS. 8A and 8B.

Figure 8D:
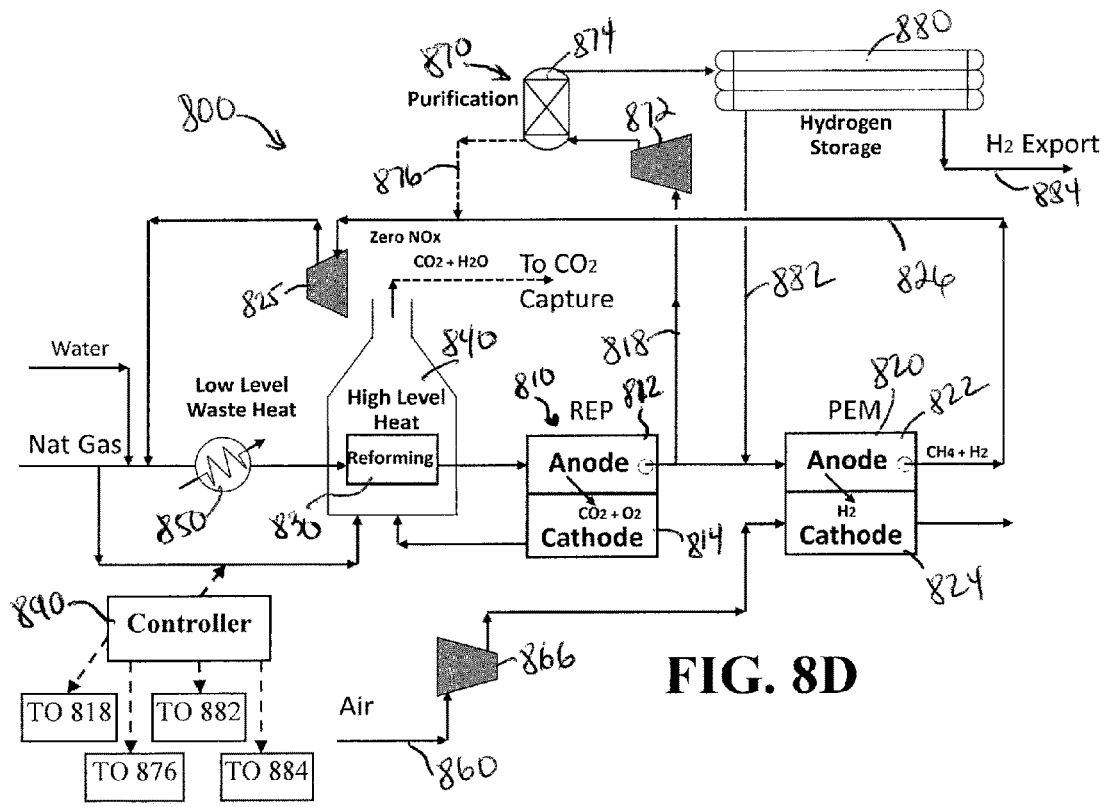

FIG. 8D shows a modified configuration of the system 800 of FIG. 8C. All of the components that are similar and have similar functions are labeled with like reference numbers and detailed description thereof is omitted. In the configuration shown in FIG. 8D, the oxidant gas comprising the $CO_2/O_2$ mixture output from the REP assembly 810 is used to oxidize fuel needed to generate the high level heat in the heater 840 for the reforming reaction in the reformer 830. In the system 800 of FIG. 8D, all of the air 860 is conveyed to the cathode side 824 of the PEM power generation system 820 via a blower 866 or the like, and the REP assembly 810 is not supplied with air. As shown, the cathode side 814 of the REP assembly 810 outputs the oxidant gas comprising the $CO_2/O_2$ mixture to the high level heater 840 where it is used to oxidize the slipstream of fuel and to generate high level heat for the reformer 830. The high level heater 840 outputs a flue gas exhaust which comprises mainly $CO_2$ and water with a small amount of unreacted oxygen and which can be processed for $CO_2$ capture. Specifically, the flue gas exhaust from the heater 840 is cooled so as to condense the water out and the resulting gas is almost pure $CO_2$ which can be easily captured for storage or other uses.

One of the advantages of the system 800 in FIG. 8D is that no NOx is produced by the high level heater 840 because no nitrogen is present in the input $CO_2/O_2$ mixture and in the oxidation reaction. Therefore, this system can be easily installed even in environmentally sensitive areas. Another advantage of the system in FIG. 8D is easy capture of $CO_2$ from the heater exhaust, as described above.

Figure 8E:
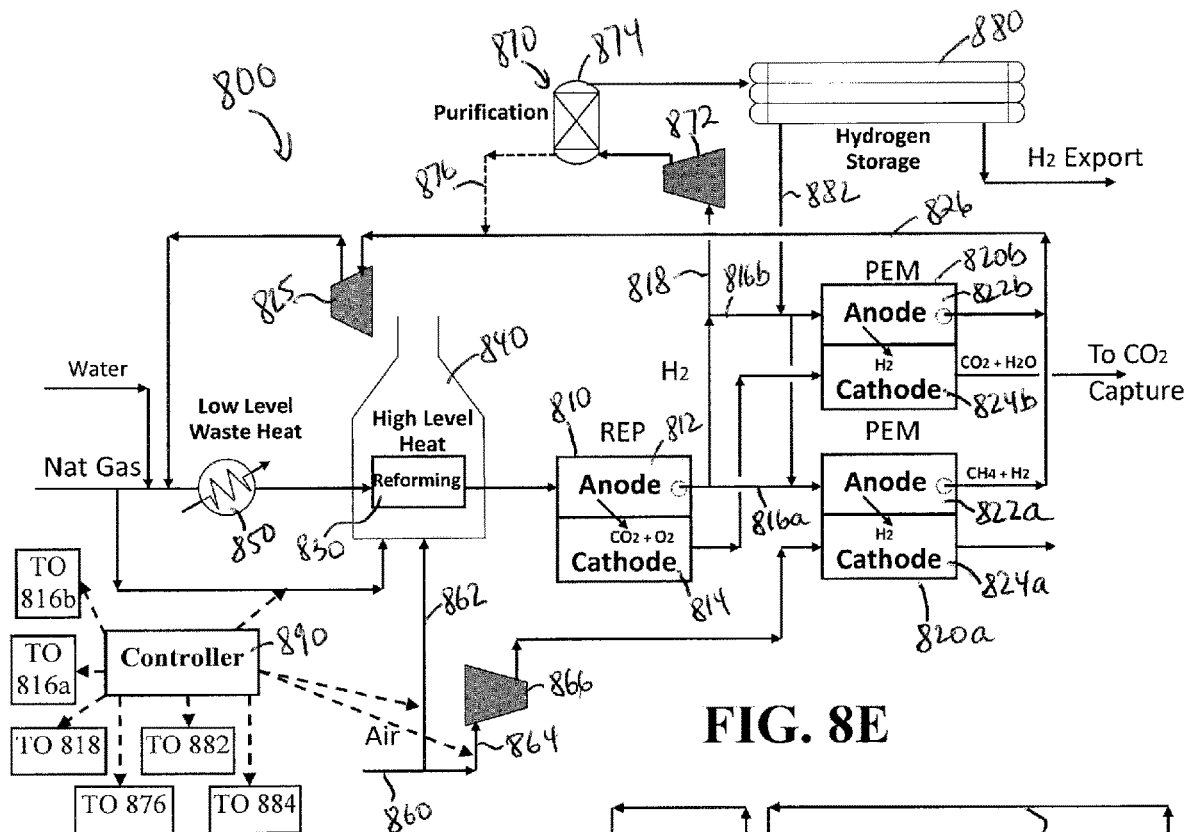

FIG. 8E shows a modified configuration of the system 800 shown in FIG. 8D and includes two PEM fuel cells 820a and 820b, wherein a first PEM fuel cell 820a is used for power generation as in FIG. 8 and a secondary PEM fuel cell 820b (second PEM fuel cell) is added for oxidizing and removing oxygen from the $CO_2/O_2$ mixture produced by the REP assembly 810 to facilitate CO2 capture while generating additional power. All of the components that are similar and have similar functions are labeled with like reference numbers and detailed description thereof is omitted.

As shown in FIG. 8E, air 860 supplied to the system, with the first portion 862 of the air being provided to the high level heater 840 and the second portion 864 of the air being provided to a cathode side 824a of the first PEM fuel cell 820a using a blower 866 or similar device. In the illustrative embodiment of FIG. 8E, no air is provided to the cathode side 814 of the REP assembly 810. The amount of the first air portion 862 and the amount of the second air portion 864 is controlled by a controller, which can be the controller 890 or a separate control device.

In FIG. 8E, a first portion 816a of the hydrogen-containing gas output from the anode side 812 of the REP assembly 810 is conveyed to an anode side 822a of the first PEM fuel cell 820a and a second portion 816b of the hydrogen-containing gas output from the anode side 812 of the REP assembly 810 is conveyed to an anode side 822b of the second PEM fuel cell 820b. Moreover, a third portion 818 of the hydrogen-containing gas, which may include all or some of the hydrogen-containing gas output from the REP assembly 810, can be conveyed to the hydrogen purification assembly 870 for storage in the hydrogen storage assembly 880 and/or recycling via the bypass path 876. The amount of the hydrogen-containing gas conveyed from the REP assembly 810 to the first and second PEM fuel cells 820a, 820b and/or to the hydrogen purification assembly 870 is controlled by the controller 890 based on external power demands on the PEM fuel cells 820a, 820b, the amount of $CO_2/O_2$ mixture produced by the REP assembly 810, the storage capacity of the hydrogen storage assembly 880 and other factors. The amount of purified and pressurized hydrogen conveyed from the purification assembly 870 to the hydrogen storage assembly 880 and/or to the hydrogen bypass path 876 is also controlled by the controller 890.

As shown in FIG. 8E, the CO2/O2 mixture output from the cathode side 814 of the REP assembly 810 is conveyed to a cathode side 824b of the second PEM fuel cell 820b where it is electrochemically reacted with the hydrogen gas provided to the anode size 822b. The cathode side 824b of the second PEM fuel cell assembly outputs a cathode exhaust comprising mostly $CO_2$ and water with a small amount of residual oxygen. This cathode exhaust can be cooled to condense out the water and thereafter provided for $CO_2$ capture for storage or other uses. Use of the secondary PEM fuel cell 820b to receive and react the $CO_2/O_2$ mixture produced by the REP assembly 810 results in a lower concentration of oxygen in the cathode exhaust without producing any CO. As a result the $CO_2$ capture from the cathode exhaust of the secondary PEM fuel cell 820b is simplified.

Figure 8F:
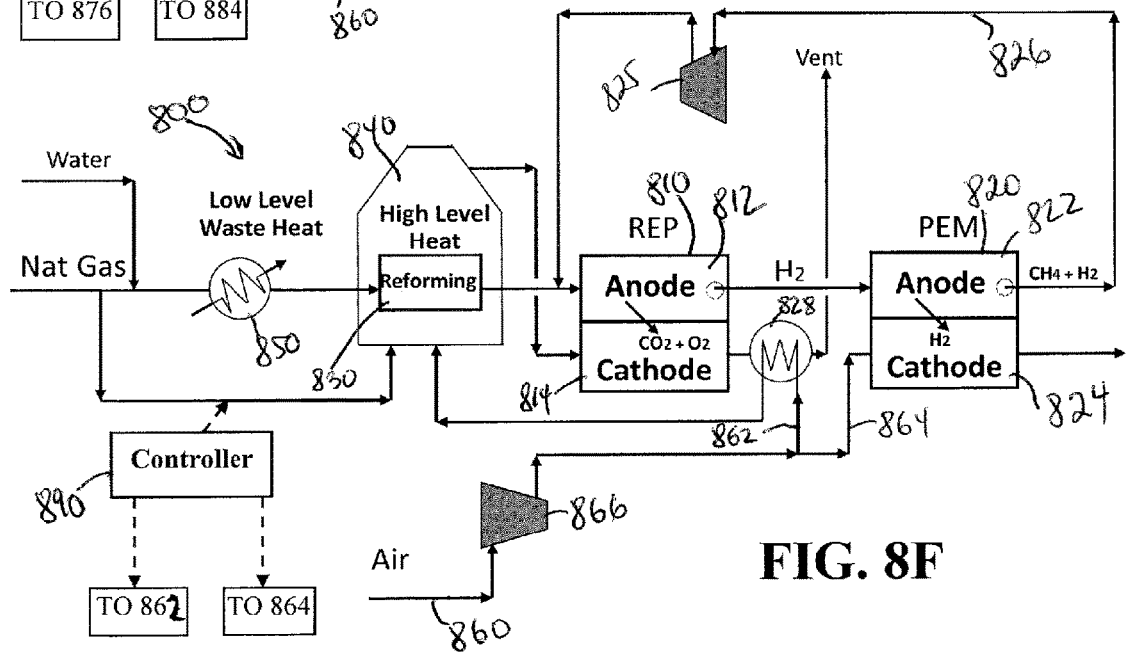

FIG. 8F shows a simplified configuration of a system 800 used for ChemCad heat and material balance simulation performed to determine the expected performance of the system 800. All of the components that are similar and have similar functions are labeled with like reference numbers and detailed description thereof is omitted. In FIG. 8F, air 860 is supplied to the system using a blower 866 or a similar device. A first portion of the air 862 is pre-heated in a heat exchanger 828 using heat from the $CO_2/O_2$ mixture output from the cathode side 814 of the REP assembly 810 before being conveyed to the high level heater 840. A second portion of the air 864 is provided to the cathode side 824 of the PEM power generation system 820. In the system of FIG. 8F, flue gas produced by the oxidizing reaction in the heater 840 is output from the heater and conveyed to the cathode side 814 of the REP assembly 810. The $CO_2/O_2$ mixture produced by the REP assembly 810 is output from the cathode side 814 of the REP assembly, conveyed through the heat exchanger 828 and output from the system.

As also shown in FIG. 8F, hydrogen-containing gas produced by the REP assembly 810 is output from its anode side 812 and conveyed to the anode side 822 of the PEM power generation system 820. Anode exhaust output from the anode side 822 of the PEM system 820 and comprising hydrogen and methane is recycled to the anode side 812 of the REP assembly 810. A blow down assembly 825 including a blower may be used in the recycling path 826 in order to keep the methane concentration in the PEM fuel cell low.

Sweeping the cathode side of the REP assembly 810 with the exhaust gas from the reformer 840 will reduce the voltage and power required by the REP assembly. The REP assembly 810 is also expected to reduce the NOx in the reformer 840 exhaust.

As mentioned above, the system of FIG. 8 was tested in a ChemCad heat and material balance simulation. Table 1 summarizes the performance results of this simulation:

TABLE 1

| | |
|---|---|
| Net Power | 92.9 kw |
| Power Efficiency | 47.82% |
| Power Efficiency without low level heat | 41.66% |
| Kg/d H2 | 167.384 |

Based on the above results of the simulation, the system 800 should be able to provide load following power generation with an efficiency of about 47% if low level waste heat is available. However, if no low level waste heat is available, then more fuel is required for the system's operation and the efficiency drops to about 42%. This balance is based on a small REP assembly that includes 40 cells.

Energy Storage Using the REP Assembly on DFC Anode Exhaust

The REP assembly of the present invention may also be used in combination with a base load direct fuel cell (DFC®) or SOFC in order to store excess power from the grid with a high round trip efficiency. Generally, in order to balance net generation of power with demand, power supply systems, such as power grids, need to store excess power during periods of high power generation from renewable generators and return it to the grid during periods of low power generation from the renewable sources which cannot be dispatched. Conventional solutions for storage of excess power have been to use batteries, low efficiency electrolyzers, compressed air energy storage, and pumped hydroelectric systems, all of which are expensive, have limited storage capacity or have high round trip energy losses. In the present invention, high round trip efficiency for storing excess power from the grid is provided by combining the DFC or SOFC operated to provide baseload power with the REP assembly that consumes excess power to generate hydrogen output.

Figure 9A:
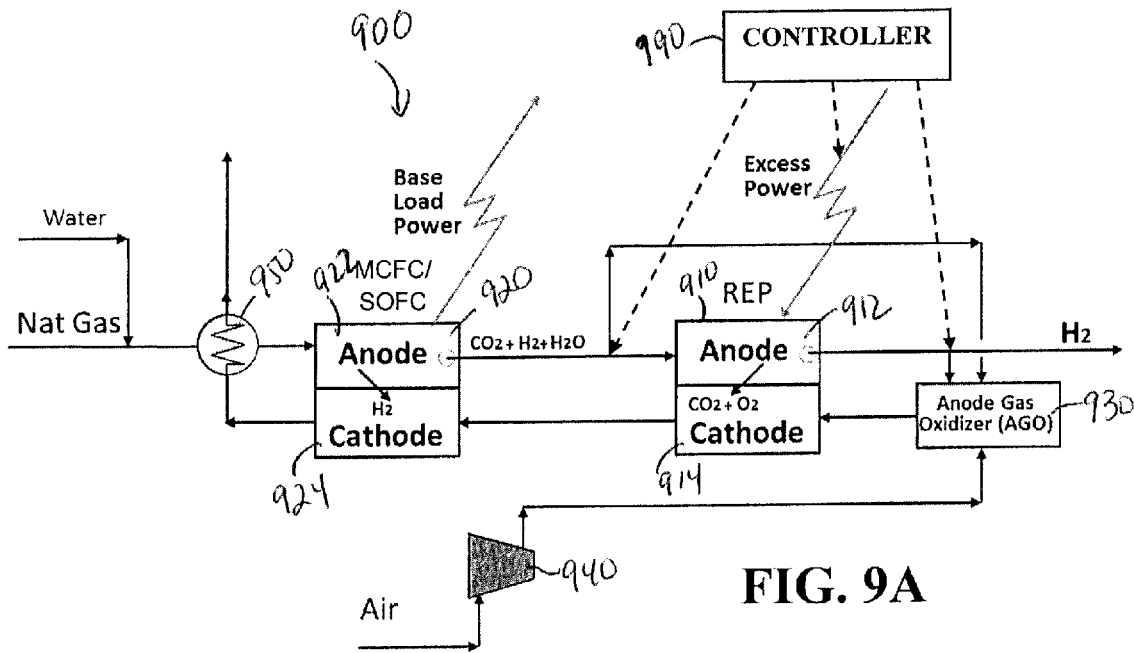
FIGS. 9A and 9B show illustrative configurations of such energy storage systems that incorporate the REP assembly of the present invention.
Figure 9B:
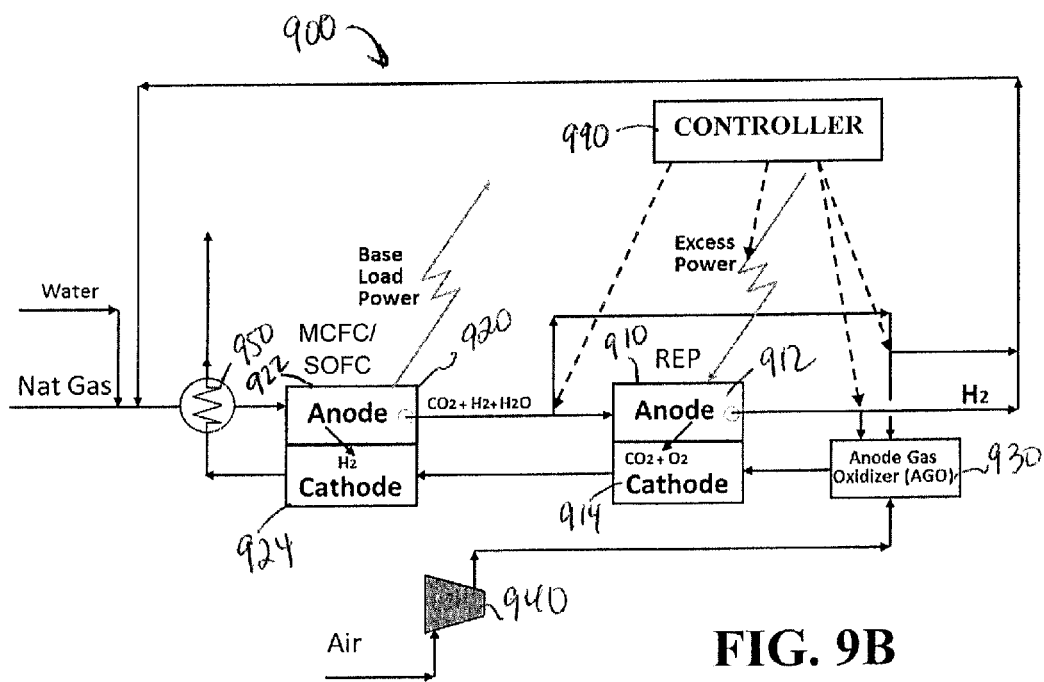

FIGS. 9A and 9B show illustrative configurations of such energy storage systems 900. In FIGS. 9A and 9B, the system 900 comprises a REP assembly 910 with an anode side 912 and a cathode side 914 separated by an electrolyte matrix, a DFC 920 with an anode side 922 and a cathode side 924 separated by a matrix, and an anode exhaust gas oxidizer (AGO) 930. The DFC 920 may be any fuel cell using a hydrocarbon feed such as a solid oxide fuel cell (SOFC) or a molten carbonate fuel cell (MCFC).

As shown in FIGS. 9A and 9B, fuel, such as natural gas, and water are supplied to the system 900 and preheated in a heat exchanger 950 so as to vaporize the water to produce steam. The fuel and steam mixture is then supplied to the anode side 922 of the DFC 920 where the fuel is internally reformed using a direct reforming catalyst and undergoes an electrochemical reaction with an oxidant gas supplied to the cathode side 924 of the DFC 920 to produce base load power. Base load power (DC power) is output from the DFC 920 and may be provided to the grid or for powering external devices. Anode exhaust comprising CO2, H2, CO, and water is output from the anode side 922 of the DFC and provided to the anode side 912 of the REP assembly 910 and/or to the AGO 930. As shown in FIG. 9B, a portion of the anode exhaust from the anode side 922 may also be recycled back to the DFC by combining the anode exhaust with recycled hydrogen as well as the fuel and water mixture supplied to the heat exchanger 950.

In FIGS. 9A and 9B, the anode side of the REP assembly 910 receives all or a portion of the anode exhaust output from the anode side 922 of the DFC. Although not shown in FIGS. 9A and 9B, steam may be added to the anode exhaust output from the anode side 922 of the DFC before the anode exhaust is supplied to the REP assembly 910. This is because heat and material balances around the system show that the anode exhaust from the DFC is slightly deficient in water content for high purity hydrogen production. The REP assembly 910 reacts the CO and $CO_2$ in the anode exhaust gas with water to produce hydrogen. The hydrogen in the anode exhaust gas is added to the hydrogen generated from the reactions in the REP assembly. Typically, anode exhaust contains 20-30% $H_2$+CO on a dry basis and the CO is converted to hydrogen during an internal water gas shift reaction in the REP assembly 910. Water and $CO_2$ in the anode exhaust are also electrochemically reacted to produce H2 and $CO_3^=$ ions, and the $CO_3^=$ ions are conveyed through the electrolyte membrane, converted to $CO_2$ and $O_2$ in the cathode side 914 and thereafter output from the cathode side 914 of the REP assembly as the oxidant gas. These reactions that occur in the REP assembly during its operation on anode exhaust from the DFC are shown in detail in FIG. 9C.

Figure 9C:
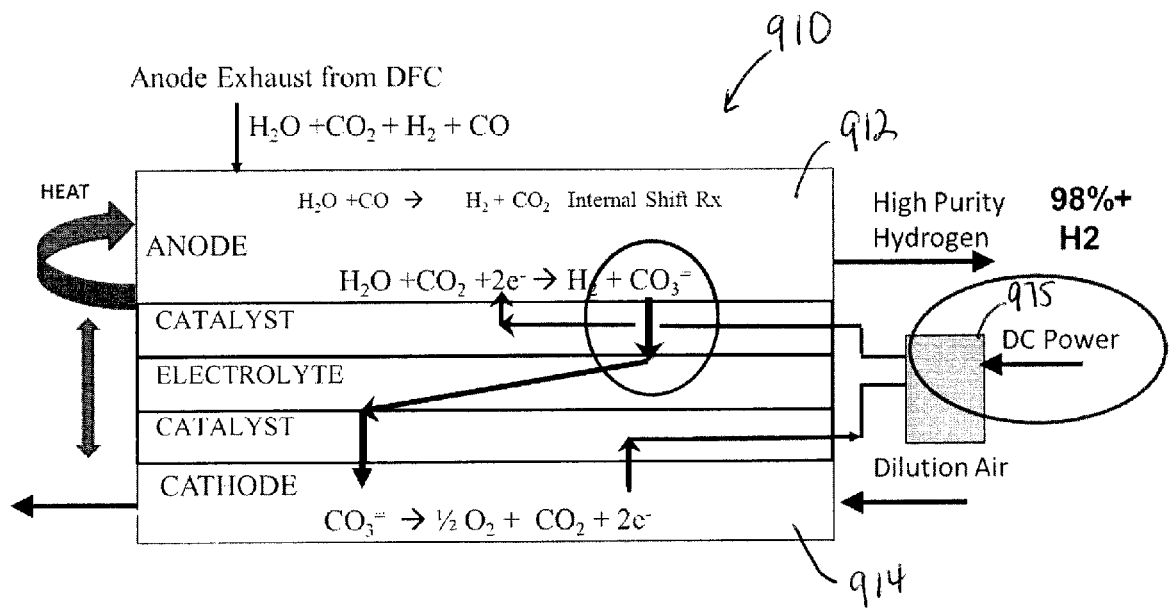
FIG. 9C shows a schematic configuration of the REP assembly and the reactions that occur therein.

As can be seen in FIG. 9C, DC power is provided to the REP assembly from a power supply 975 to apply a reverse voltage to the at least one electrolyzer fuel cell of the REP assembly. Since the anode exhaust already contains hydrogen, the power consumption per kilogram of hydrogen output from the REP assembly 900, including the hydrogen input with the anode exhaust, is about 75% of the typical 35 kWh/kg power consumption, or about 26 kWh/kg. Since the power consumption per kilogram of hydrogen output by the REP assembly 900 is reduced, the round-trip efficiency for storing power is roughly doubled when compared to standard low temperature electrolyzers.

Referring again in FIGS. 9A and 9B, air is supplied to the AGO 930 using a blower 940 or a similar device. The AGO 930 also receives a portion of the anode exhaust from the anode side 922 of the DFC 920 and can also receive a portion of the hydrogen-containing gas generated in the REP assembly and output from the anode side 912 of the REP assembly 900. This allows the AGO temperature to be controlled independent of the REP operation The AGO 930 oxidizes the fuel in the DFC anode exhaust and/or the hydrogen-containing gas to produce and output heated oxidant gas, which is conveyed to the cathode side 914 of the REP assembly 910. The supply of heated oxidant gas to the REP assembly 900 reduces the power requirements of the REP assembly, thus increasing its efficiency. As shown in FIGS. 9A and 9B, the oxidant gas comprising the $CO_2$ and $O_2$ mixture produced in the REP assembly 900 is conveyed from the cathode side 914 of the REP assembly 900 to the cathode side 924 of the DFC 920. Cathode exhaust output from the cathode side 924 of the DFC 920 is sent to the heat exchanger 950 for preheating the fuel and water mixture input into the system 900 before being vented out of the system.

In FIGS. 9A and 9B, a controller 990 is used to control the operation of the system 900, including controlling distribution of the anode exhaust from the DFC 920, controlling distribution of the hydrogen-containing gas output from the anode side of the REP assembly 910 and providing excess power to the REP assembly 910 depending on the external power demands and the availability of excess power. Specifically, the DFC is operated to generate base load power which is used for external power demands, e.g. the grid, and all or a portion of the anode exhaust from the DFC 910 is output directly to the REP assembly 910. When there is no excess power on the grid to be stored, the DFC anode exhaust is conveyed through the REP assembly 910 and is output from the anode side 912 of the REP assembly 910 unchanged, i.e., the hydrogen-containing gas is unchanged anode exhaust. In this way, the REP assembly 910 is kept hot and ready to operate on demand whenever excess power appears on the grid. In such cases, the controller 990 controls the hydrogen-containing gas from the REP assembly 910 to be conveyed to the AGO 930, which also receives air and burns or oxidizes the anode exhaust to produce hot oxidant gas containing $N_2$, $O_2$ and $CO_2$. This hot oxidant gas is then conveyed to the cathode side 914 of the REP assembly 910, and oxidant gas output from the cathode side 914 of the REP assembly 910 is then conveyed to the DFC cathode side 924. Conveying the hot oxidant gas through the REP assembly helps to keep the REP assembly 910 hot regardless of whether the REP assembly is operating on excess power or is idle.

When excess power is available and needs to be stored, the controller 990 controls to provide the excess power to the REP assembly 910 so that a reverse voltage is applied by the power supply to the at least one electrolyzer fuel cell and the DFC anode exhaust supplied to the REP assembly 910 is converted to hydrogen. In this case, the controller 990 controls the amount of DFC anode exhaust bypassed around the REP assembly 910 based on the amount of excess power available and provided to the REP assembly. Through such control, the portion of the DFC anode exhaust fed to the REP assembly 910 balances the excess power provided to the REP assembly to produce high purity (>97%) hydrogen gas. In the system of FIG. 9B, the controller further controls the amount of bypassed DFC anode exhaust provided to the AGO 930 and the amount of the remaining bypassed DFC anode exhaust recycled to the DFC 920 and mixed with the hydrogen-containing gas recycled from the REP assembly. Specifically, in FIG. 9B, the controller 990 controls the amount of the bypassed DFC anode exhaust mixed with the hydrogen and recycled to the DFC 920 based on a desired H2/CO2 ratio in the recycled gas mixture.

The controller 990 also controls the amount of hydrogen-containing gas output from the REP assembly provided to the AGO 930 and the amount of hydrogen-containing gas output for external uses, e.g., exported, as shown in FIG. 9A, and/or the amount of hydrogen-containing gas recycled back to the DFC 920, as shown in FIG. 9B, based on whether the REP assembly 910 is operating on excess power or is idle and based on the amount of heat needed to be generated in the AGO 930, i.e., temperature of the AGO. For example, when the REP assembly 910 is operating on excess power and the amount of DFC anode exhaust bypassed around the REP assembly and provided to the AGO is insufficient for maintaining the AGO temperature at the predetermined temperature, the controller 990 controls to provide a portion of the hydrogen-containing gas output from the REP assembly to the AGO so as to maintain the predetermined temperature in the AGO. The controller 990 further controls to increase the amount of hydrogen-containing gas from the REP assembly supplied to the AGO as the amount of excess power provided to the REP assembly increases and the amount of DFC anode exhaust bypassed around the REP assembly to the AGO decreases. In contrast, when the REP assembly 910 is idle, all of the DFC anode exhaust may be provided to the REP assembly 910 to keep the REP assembly hot and, the controller 990 controls so that all or a large portion of the hydrogen-containing gas output from the anode side 912 of the REP assembly is conveyed to the AGO 930 so as to maintain the predetermined temperature in the AGO.

By combining the DFC with the REP assembly and using excess power in the REP assembly for hydrogen production, the excess power is stored in the form of hydrogen produced with high power storage round trip efficiency. In the configuration of FIG. 9A, the power storage round trip efficiency is estimated as follows:

Power Stored
Hydrogen production—26 kWh/kg
Hydrogen storage—3 kWh/kg
Power Produced
Power production at 55% efficiency—18.5 kWh/kg
Round-trip efficiency=18.5/(26+3)=64% (or 71% without high pressure storage)

Although the 64% or 71% round trip efficiency of the system in FIG. 9A is similar to the 70-80% round trip efficiency achievable with conventional battery storage, the system of FIG. 9A has the advantage of producing hydrogen which can be stored in large volumes over long periods of time with no loss in efficiency. Moreover, the hydrogen produced by the system of FIG. 9A can be exported to provide fuel to devices operating on hydrogen such as PEM fuel cells and fuel cell vehicles or to provide hydrogen to chemical and refining operations. Exporting the hydrogen, as in the system of FIG. 9A, typically provides a higher value than converting the hydrogen back into power.

The system shown in FIG. 9B provides another option to avoid storage energy losses by utilizing the low-pressure hydrogen generated by the REP assembly 910 in the base load DFC 920. In the system of FIG. 9B, recycling of the hydrogen-containing gas to the DFC 920 reduces the natural gas consumption while the base load power production is unchanged. When the hydrogen-containing gas is recycled from the REP assembly to the DFC 920, some of the unpurified anode exhaust gas may also be recycled, as shown in FIG. 9B. This further increases the efficiency of the system by recovering additional hydrogen with zero power consumption. As discussed above, the controller 990 controls the amount of bypassed DFC anode exhaust which is mixed with the hydrogen-containing gas from the REP assembly and recycled to the DFC 920 based on the desired H2/CO2 ratio in the mixture. Preferably, the controller 990 controls the bypassed DFC anode exhaust so that a mixture of hydrogen-containing gas and DFC anode exhaust has a H2/CO2 ratio of about 4. With this ratio of gases, most of the CO2 and hydrogen can be converted back to methane before entering the DFC so that the heat balance in the DFC is unchanged from normal operation. In the system of FIG. 9B, low purity hydrogen is sufficient for recycling to the DFC, which does not require steam addition to the DFC anode exhaust and which simplifies the process.

Using the system of FIG. 9B, about 2 times the base load power production can be stored before the CO2 in the anode exhaust is exhausted. This calculation is based on 125% of the CO2 being in the anode exhaust relative to the CO2 transferred during power production and the higher voltage (1.25) required by the REP assembly relative to the voltage of the DFC (~0.78). As a result, a 2.8 MW DFC net output would range from +2.8 MW with no power to the REP assembly to −2.8 MW with maximum power to the REP assembly.

Although the illustrative systems shown in FIGS. 9A and 9B use the REP assembly 910 for generating hydrogen using excess power, it is contemplated that in addition to producing hydrogen for energy storage, the REP assembly could also be operated in a power producing mode to generate additional power to increase the efficiency of the system 900. The systems of FIGS. 9A and 9B may be modified so that the REP assembly 910 is controlled to operate as a high temperature electrolyzer in a hydrogen producing mode when excess power is available for storage or in a power producing mode to generate additional power during high power demands. In such configurations, the controller 990 controls the operation mode of the REP assembly based on the external power demand and/or availability of excess power for storage. The systems of FIGS. 9A and 9B may be further modified so as to include two or more topping DFCs and at least one bottoming REP assembly comprising a fuel cell stack or a DFC stack, wherein anode exhaust from the topping DFCs is supplied to an anode side of the bottoming REP assembly, preheated air and/or hot oxidant gas produced in the AGO is supplied to a cathode side of the bottoming REP assembly and cathode exhaust (oxidant gas) output from the bottoming REP assembly is supplied to respective cathode sides of the topping DFCs. An illustrative embodiment of such a system is shown in FIG. 2 of U.S. application Ser. No. 14/578,077, assigned to the same Assignee herein and incorporated herein by reference.

In such systems which include load following with a high temperature fuel cell such as the REP or DFC, the system must be close to thermally neutral in order to avoid heating and cooling parts of the bottoming REP stack since cycling greatly reduces the stack life. The thermal balance can be adjusted by adding supplemental methane fuel to the anode exhaust of the topping DFCs so that the reforming of the methane fuel in the bottoming REP assembly operating in the power producing mode absorbs the heat generated from cell resistance and the current density. The controller controls the supply of the supplemental methane fuel at a rate, which is based on the current density. In some illustrative embodiments, methane concentration in the anode exhaust output from the topping DFCs may be increased, prior to supplying the anode exhaust to the bottoming REP assembly operating in the power producing mode, by cooling a portion of the anode exhaust gas of the topping DFCs and using a catalyst to convert hydrogen in the anode exhaust to methane by the following reaction:

$$4H_2+CO_2 \rightarrow CH_4+2H_2O \qquad (3)$$

Moreover, when the bottoming REP assembly operates in the power producing mode, the current density may be limited by the heat generated in the cells of the REP assembly.

Conversion of ADG Fuel to Natural Gas by CO2 Removal Using the REP Assembly

The REP assembly of the present invention can also be used for conversion of one fuel with a higher CO2 content, such as renewable anaerobic digester gas (ADG), to another fuel with a lower CO2 content, such as pipeline natural gas, by efficiently removing CO2 from the first fuel. Typically, renewable ADG comprises a mixture of about 60 vol % $CH_4$ and about 40 vol % $CO_2$. Conventionally, ADG is converted to natural gas by compressing ADG to high pressure and removing CO2 using PSA systems, or by converting CO2 to CH4 by adding hydrogen. The former technique results in removal of a portion of CH4 with the CO2, which must be flared to prevent CH4 emissions and further has high compression costs since CO2 as well as CH4 must be compressed. The latter conventional technique requires expensive hydrogen and about 17% of the hydrogen energy is converted into heat rather than CH4 due to the exothermic nature of the reaction.

The present invention overcomes these difficulties by using the REP assembly described above to convert ADG to natural gas by removing most of the CO2 electrochemically in the REP assembly and by removing remaining CO2 by a methanation reaction of CO2 with H2 produced in the REP assembly.

Figure 10A:
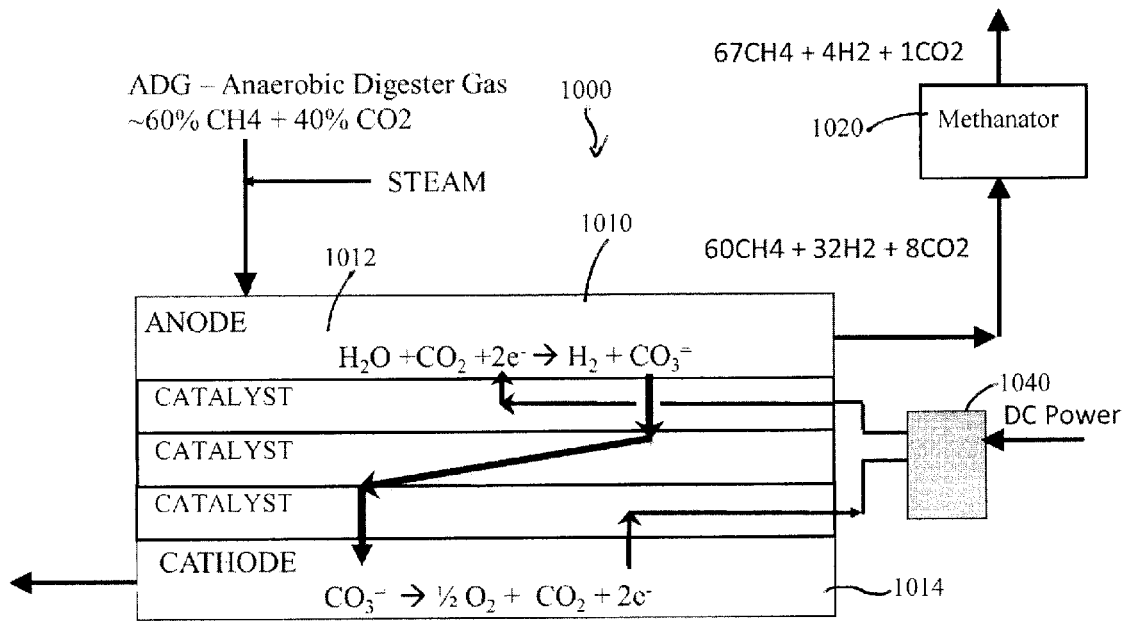
FIGS. 10A and 10B show illustrative ADG conversion systems that use the REP assembly and a methanation assembly for converting anaerobic digester gas (ADG) to natural gas.
Figure 10B:
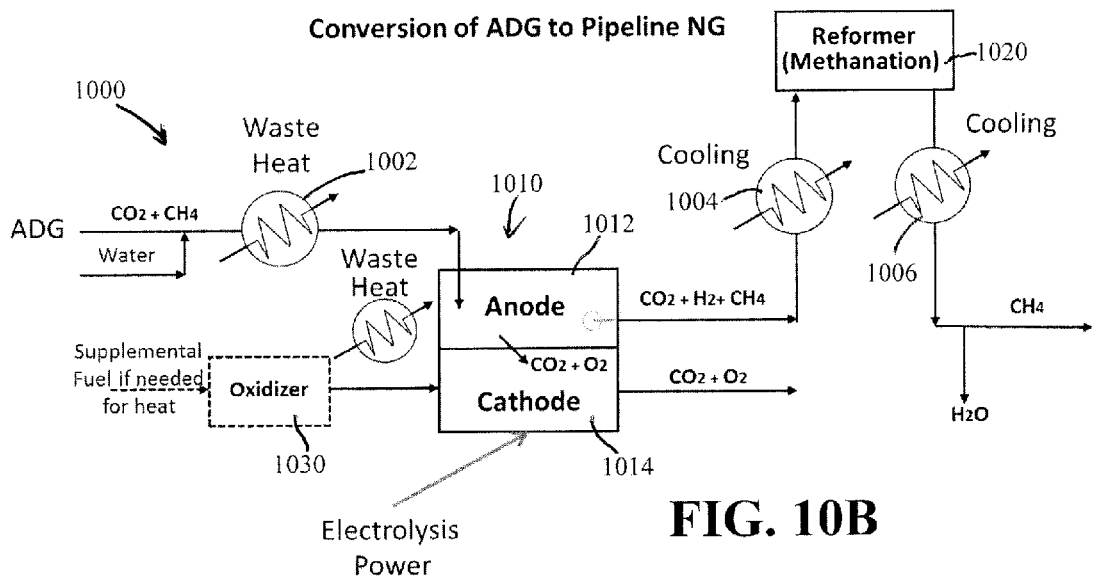

FIGS. 10A and 10B show illustrative ADG conversion systems 1000 that include a REP assembly 1010 for electrochemically removing the $CO_2$ from ADG fuel and a methanation reactor 1020 receiving a hydrogen gas mixture from the REP assembly 1010 and removing remaining $CO_2$ and H2 from the gas mixture by reacting $CO_2$ and $H_2$ to output $CH_4$, or natural gas. As shown, an anode side 1012 of the REP assembly 1010 receives ADG fuel, which includes about 60% $CH_4$ and about 40% $CO_2$, and steam and reacts the CO2 in ADG fuel with the water so as to generate and output a hydrogen-containing gas comprising a mixture of hydrogen, $CH_4$ and $CO_2$ from the anode side 1012 and to output an oxidant gas comprising a mixture of $CO_2$ and $O_2$ from a cathode side 1014 of the REP assembly 1010. As discussed above, these reactions in the REP assembly require a supply of DC power from a power supply 1040, which applies a reverse voltage to the at least one electrolyzer fuel cell of the REP assembly. FIG. 10A shows the detailed reactions that occur in the REP assembly 1010, which are discussed herein above with respect to FIG. 4. As shown in FIG. 10, the REP assembly does not include a reforming unit or reforming fuel cells. Also, no reforming catalyst is required in the REP cells.

The REP assembly 1010 removes the bulk of $CO_2$ from the ADG fuel (about 80%) and at the same time adds to the ADG fuel stream the hydrogen needed to convert the remaining $CO_2$ to $CH_4$. The hydrogen containing gas comprising the mixture of hydrogen, CO2 and $CH_4$ output from the REP assembly 1010 is conveyed to the methanation reactor 1020 where hydrogen is reacted with the $CO_2$ to form $CH_4$ and water by a methanation reaction (see also, equation (3)) as follows:

$$CO_2+4H_2 CH_4+2H_2O$$

The overall reaction that occurs in the system 1000 is as follows:

$$5CO_2+4H_2O \; CO_2+4H_2+4CO_3^= \uparrow \rightarrow CH_4+2H_2O \qquad (4)$$

As seen in the overall reaction (4) of the system 1000, only 20% of hydrogen that would be required to convert all of the $CO_2$ to methane is needed since 80% of the CO2 is removed in the electrolysis reaction in the REP assembly 1010. Since approximately 17% of the energy in the hydrogen is used in the $CO_2+H_2$ reaction is converted into heat, the system of FIGS. 10A and 10B is much more efficient due to the removal of about 80% of $CO_2$ using the REP assembly 1010 as compared to a hydrogen purification reaction without prior $CO_2$ removal by the REP assembly. Moreover, the system 1000 of FIGS. 10A and 10B also benefits from the high efficiency of the high temperature electrolysis in the REP assembly 1010 which uses about 55% of the power per kilogram of hydrogen needed by a typical low temperature electrolysis system. The power used to remove CO2 also produces hydrogen so that the bulk of the power cost is offset by the additional CH4 produced from the reaction of that hydrogen with CO2.

Table 2 summarizes the impact of $CO_2$ removal using the REP assembly on CO content, Wobbe number and efficiency:

TABLE 2

| Case | % CO2 removed | % CH4 in NG product | CO ppm | Wobbe, HHV | Eff | Overall Eff (47% pwr eff) |
|---|---|---|---|---|---|---|
| 1 | 78.6% | 94.0% | 220 | 1,294 | 97.4% | 84.1% |
| 2 | 80.0% | 94.4% | 147 | 1,315 | 97.4% | 83.9% |
| 3 | 82.1% | 93.2% | 37 | 1,332 | 97.4% | 83.6% |
| 4 | 90.0% | 76.2% | 0 | 1,280 | 98.3% | 81.4% |
| 5 | 100.0% | 60.0% | 0 | 1,227 | 99.4% | 83.2% |

As shown in Table 2, it may be desirable to remove more than 80% of the CO2 in the ADG fuel in order to minimize the generation of CO and to increase the wobbe number of the natural gas. The excess hydrogen in the gas suppresses the formation of CO in the methanation reaction and has a minimal impact on the system efficiency or the wobbe number.

FIG. 10B shows an illustrative overall configuration of the system 1000 of FIG. 10A. In FIG. 10B, ADG fuel comprising $CO_2$ and $CH_4$ is mixed with water and preheated in a first heat exchanger 1002 using waste heat so as to vaporize the water to form steam. The heated mixture of ADG fuel and steam is then supplied to the anode side 1012 of the REP assembly 1010. After undergoing the high temperature electrolysis reaction in the REP assembly, the anode side 1012 of the REP assembly 1010 outputs the hydrogen-containing gas comprising a mixture of hydrogen, CH4 and reduced $CO_2$ content (about 20%). This mixture is cooled in a second heat exchanger 1004 before being supplied to the methanation reactor 1020 where the $CO_2$ in the mixture is reacted with hydrogen to produce $CH_4$. The methanation reactor 1020 outputs a mixture of $CH_4$ and water, which is cooled in the heat exchanger 1006 and may undergo condensation of water. The resulting gas produced by the system 1000 is relatively pure methane (natural gas) with greater than 93% $CH_4$ content and less than 2% $CO_2$ content.

Waste heat in the gas mixture output from the anode side 1012 of the REP assembly and/or waste heat generated from the methanation reaction in the reactor 1020 may be used to preheat the ADG in the first heat exchanger 1002 so as to generate the steam needed by the process in the REP assembly. Thus, the first, second and third heat exchangers 1002, 1004, 1006 may be the same heat exchanger adapted to recover waste heat from the hydrogen mixture and the methane mixture and to use this waste heat to preheat the ADG and water mixture.

In the illustrative system of FIG. 10B, an oxidizer 1030 may be included in the system 1000 for generating additional waste heat which may be used in the heat exchanger 1002 for preheating the ADG fuel and water. The oxidizer 1030 receives and burns or oxidizes supplemental fuel to generate the waste heat and oxidant gas, and the oxidant gas output from the oxidizer is conveyed to the cathode side 1014 of the REP assembly. A controller (not shown) may be used to control the supply of supplemental fuel to the oxidizer 1030 based on the heating needs for preheating the ADG fuel and water.

The above described systems of FIGS. 10A and 10B provide an efficient and lower cost technique for converting renewable ADG gas to pipeline natural gas ($CH_4$). This allows for a less costly use of renewable fuels, such as renewable ADG. At the same time, carbon dioxide removed from the ADG gas and output from the cathode side of the REP assembly may be captured and sequestered or used for other purposes so as to limit $CO_2$ emissions.

CO2 Capture Leveraging Using the REP Assembly

The REP assembly of the present invention can also be used with boilers, coal-powered power plants and other devices so as to efficiently capture CO2, particularly CO2 from produced from coal. Conventional systems use an amine absorption stripper system in order to capture CO2, which are usually too energy intensive. Another system, described in U.S. Pat. No. 7,396,603, assigned to the same assignee herein, uses a molten carbonate fuel cell (MCFC) for generating power using fuel and flue gas output from a coal powered power plant. However, in such MCFC systems, the fuel cell incurs a voltage penalty due to the dilution of the cathode gas with a large quantity of nitrogen contained in the flue gas, thus lowering the efficiency and power output of the fuel cell.

A CO2 capture system of the present invention receives flue gas from a boiler, a coal powered power plant or any other flue gas generating assembly, processes the flue gas to remove impurities which may poison the REP assembly, and provides the processed flue gas together with steam and a small amount of fuel, such as methane or natural gas which creates a reducing gas mixture, to the REP assembly, which generates hydrogen gas, separates CO2 and outputs the hydrogen-containing gas and separately outputs the oxidant gas comprising a mixture of CO2 and oxygen. The oxidant gas comprising the mixture of CO2 and O2 output from the REP assembly can used in coal powered systems instead of air to produce a pure CO2 exhaust without nitrogen which can then be compressed and captured.

Figure 11A:
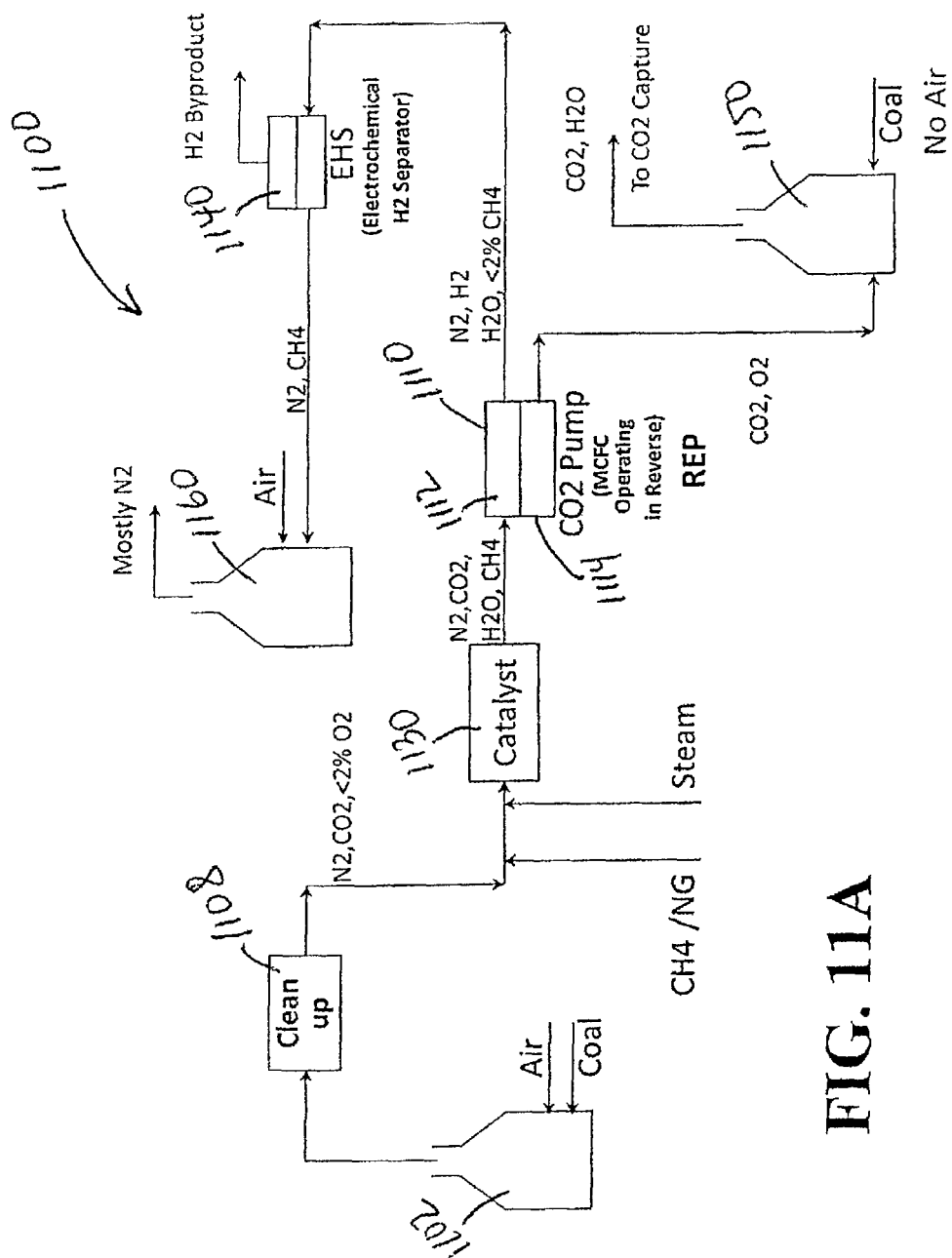
FIGS. 11A-11C show illustrative configurations of CO2 capture systems that use the REP assembly of the present invention for electrochemically reacting flue gas output from another fuel powered device.
Figure 11B:
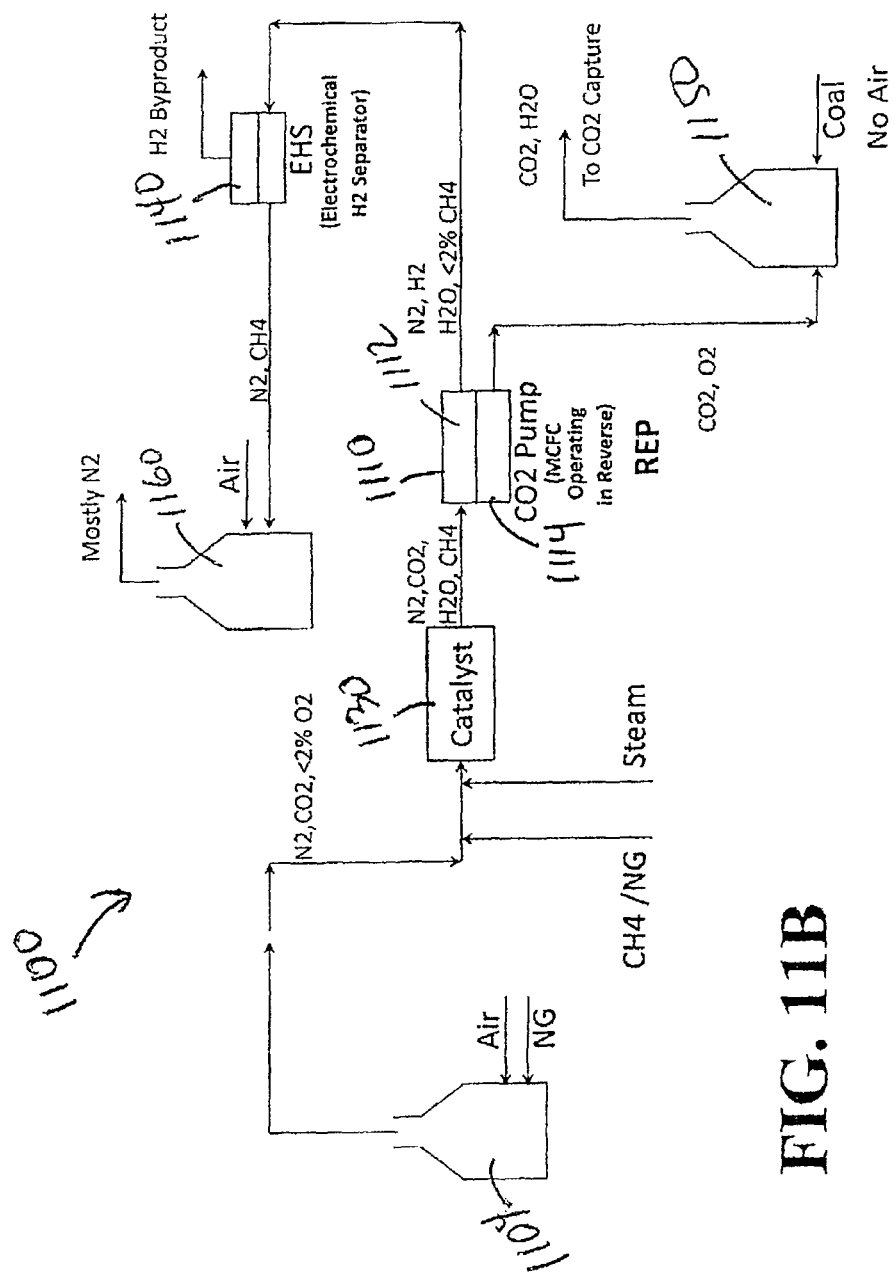
Figure 11C:
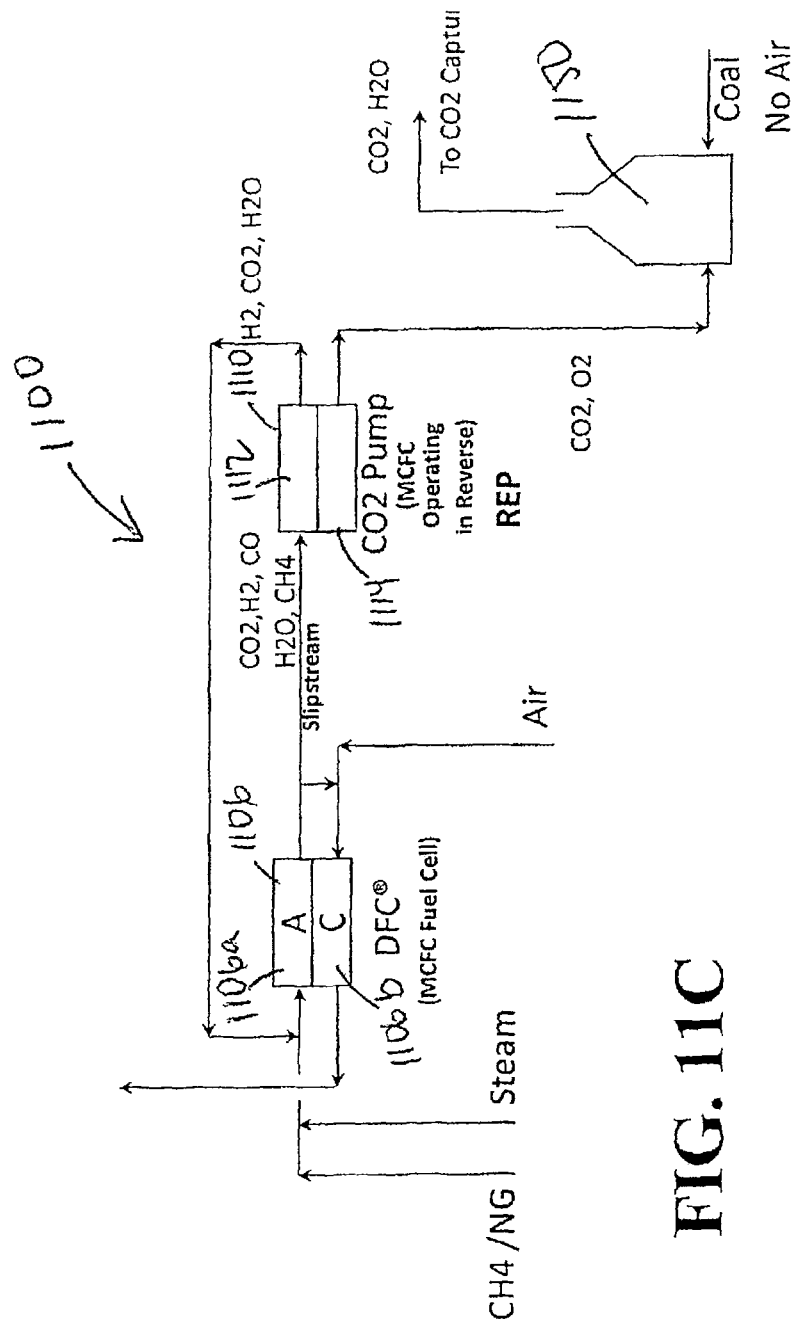

FIGS. 11A-11C show illustrative configurations of the CO2 capture system 1100 that receive flue gas from a coal fired power plant 1102 (FIG. 11A), a natural gas fired boiler 1104 (FIG. 11B), a fuel cell assembly 1106, e.g., a DFC assembly, (FIG. 11C) or similar fuel utilizing devices and which use a REP assembly 1110 (also referred to as CO2 pump) for electrochemically reacting the flue gas, methane or natural gas fuel and steam to produce hydrogen gas and to separate CO2 so as to output a CO2/O2 mixture. As shown in FIG. 11A, when flue gas is received from a coal burning device 1102, a cleanup assembly 1106 is used for processing the flue gas to remove impurities therefrom that may poison the REP assembly 1110, such as sulfur and halides, and to output a processed flue gas mixture of CO2, N2 and a small amount of unreacted oxygen (less than 2%). Since MCFC fuel cells, including the REP assembly, require essentially zero sulfur and zero halides in the reactant streams to avoid poisoning, cleanup of the flue gas can be difficult. In the systems 1100 of FIGS. 11B and 11C, a cleanup assembly is not required since the flue gas is generated from a natural gas fired boiler or a DFC system. Moreover, any NOx generated by the natural gas boiler does not impact the REP assembly operation and is typically destroyed in the high temperature reducing atmosphere of the REP assembly.

As shown in FIGS. 11A and 11B, flue gas contains a small amount of unreacted oxygen, which is usually less than 2%. In order to remove this unreacted oxygen, in the systems of FIGS. 11A and 11B, a small amount of methane or natural gas is added to the flue gas stream (after cleanup in FIG. 11), and this mixture is then conveyed over a catalyst 1130 so as to react the oxygen with methane and to produce heat needed to preheat the gases before conveying them to the REP assembly 1110. As shown in FIGS. 11A and 11B, steam is also added to the mixture of flue gas and methane since water is needed for the reaction in the REP assembly to produce $CO_3^=$ ions. In the system of FIGS. 11A and 11B, a deoxidized mixture of N2, CO2, $H_2O$ and CH4 is then conveyed to an anode side 1112 of the REP assembly 1110, where the CO2 is reacted with water to generate $CO_3^=$ and hydrogen, as discussed above with respect to FIG. 4. This reaction is driven forward by the electrochemical removal of the $CO_3^=$ ions across the membrane to a cathode side 1114 of the REP assembly so that the hydrogen-containing gas comprising of mainly nitrogen and hydrogen with some CH4 is generated and output from the anode side 1112. The REP assembly 1100 also outputs the mixture of CO2 and O2 from the cathode side 1114.

In the systems 1100 of FIGS. 11A and 11B, the hydrogen-containing gas output from the anode side of the REP assembly is purified and compressed in an electrochemical H2 separator (EHS) 1140. Purified hydrogen output from the EHS 1140 can be stored at pressure and/or exported for uses described above. As shown in FIGS. 11A and 11B, methane and nitrogen separated from the hydrogen in the EHS 1140 may be conveyed for use as fuel in a boiler or an oxidizer 1160 which burns the CH4 with air to output an exhaust comprising mostly N2 gas.

As also shown in FIGS. 11A and 11B, the oxidant gas comprising the CO2/O2 mixture output from the cathode side 1114 of the REP assembly can be conveyed to a coal boiler or a coal power plant 1150 for use instead of air, so that an exhaust containing CO2 and water, without nitrogen, is produced as a result of burning the coal. This exhaust can then be cooled to condense out the water and the resulting pure CO2 gas can be captured and sequestered or used for other purposes.

In FIG. 11C, a power generating fuel cell assembly 1106 is used as the source of the CO2 and oxygen for the coal boiler or coal power plant 1150. Specifically, an anode side 1106a of the fuel cell assembly 1106 receives fuel, such as methane or natural gas, mixed with steam, while a cathode side 1106b of the fuel cell assembly 1106 receives air. Cathode exhaust output from the cathode side 1106b is vented out, while a portion of the anode exhaust comprising CO2, H2, CO, $H_2O$ and CH4 output from the anode side 1106a is conveyed to the anode side 1112 of the REP assembly 1110. As discussed above, no cleanup of the anode exhaust is required before it is conveyed to the REP assembly 1110.

As shown in FIG. 11C, fuel cell assembly 1106 may be any high temperature fuel cell such as an SOFC or a MCFC. If the fuel cell assembly 1106 is an MCFC, a portion of the anode exhaust may be mixed with air which is conveyed to the cathode side 1106b of the fuel cell assembly 1106 to provide the CO2 required by the cathode of this type of fuel cell.

In the REP assembly 1110, the CO2 is reacted with water to produce hydrogen and $CO_3^=$ ions, and the $CO_3^=$ ions are conveyed across the matrix. The anode side 1112 of the REP assembly 1110 outputs hydrogen-containing gas which includes small amounts of water and CO2, and this hydrogen-containing gas is recycled back to the anode side 1106a of the fuel cell assembly 1106. In this case, the hydrogen-containing gas output from the REP assembly includes any remaining hydrogen output from the fuel cell assembly with the anode exhaust as well as the hydrogen generated in the REP assembly. The recycling of the hydrogen-containing gas from the REP assembly to the fuel cell assembly 1106 reduces the fuel requirements of the fuel cell assembly 1106 and increases its efficiency.

The cathode side 1114 of the REP assembly 1110 outputs the oxidant gas comprising a CO2/O2 mixture which is conveyed to a coal boiler or a coal burning power plant 1150 which burns coal, without any additional air input, and outputs an exhaust comprising a mixture of CO2 and water. The coal boiler/power plant exhaust is cooled to condense out the water and to produce high purity CO2 gas which can then be captured and sequestered or used in other devices. The same benefits would occur for a natural gas or other hydrocarbon fed boiler/power plant.

The systems 1100 of FIGS. 11A-11C have the advantage of removing CO2 which can be used in a coal or other hydrocarbon burning devices and thereafter captured, while also producing hydrogen, which can be stored, exported or used in a power producing device. The value of the hydrogen generated offsets most of the costs of the power needed by the REP assembly 1110. Particularly in locations with high hydrogen value, the power required by the REP assembly 1110 could be completely paid for by the hydrogen generated by the REP assembly. The extra power required is generally in line with the power lost due to the lower efficiency when running a carbon dioxide capture MCFC described in the U.S. Pat. No. 7,396,603. Moreover, the systems of FIGS. 11A-11C have an advantage created by using the CO2/O2 mixture generated by the REP assembly in a coal boiler or a coal power plant in place of air to produce a pure CO2 exhaust gas. Specifically, such use captures oxygen as well as CO2, and as a result, 1½ times the CO2 capture by the REP assembly is available for sequestration when the oxygen is used to replace air in a typical boiler.

Moreover, when coal is used for power production, one of the concerns with power generated from coal is its inability to efficiently load follow. The systems of FIGS. 11A-11C also overcome these concerns because the hydrogen generated in the systems 1100 of FIGS. 11A-C could be used in a low temperature fuel cell to load follow and produce peak power or alternatively, the hydrogen can be exported for fuel cell vehicles and industrial uses.

Combined Gasification and REP Assembly for CO2 Capture

The REP assembly of the present invention may be used in combination with a gasification assembly in order to provide a system that gasifies carbonaceous fuel, such as biomass or coal, to produce hydrogen without CO2 emissions.

A conventional gasifier assembly is used for converting carbonaceous fuels to syngas containing hydrogen, CO and CO2. However, in order to obtain high hydrogen syngas, the CO and CO2 must be removed from the syngas output from the gasifier. Conventional separation of CO2 from syngas is costly and makes efficient capture of CO2 difficult.

The combined gasifier and REP assembly of the present invention uses low cost CO2 pumping by the REP assembly to produce high hydrogen (95%+) syngas and pure CO2 flue gas separated from the syngas output by the gasifier assembly. The REP system of the present invention produces a low cost oxygen stream, which when integrated with an indirect gasifier assembly produces a pure CO2 stream for capture. In the present system, power consumed by the REP assembly for pumping the CO2 is offset and paid for by the value of the hydrogen co-produced from water in the electrolysis reaction. As a result, the system of the invention has a low capital cost, low operating cost and high efficiency. The advantage of the system of the invention is that it purifies syngas output by the gasifier assembly by removing CO and CO2 therefrom, produces low cost oxygen and CO2 mixture for the gasification process in the gasifier assembly, produces a fairly pure CO2 flue gas for CO2 capture, and adds to the hydrogen from the purified syngas by producing additional hydrogen as a by-product.

Figure 12:
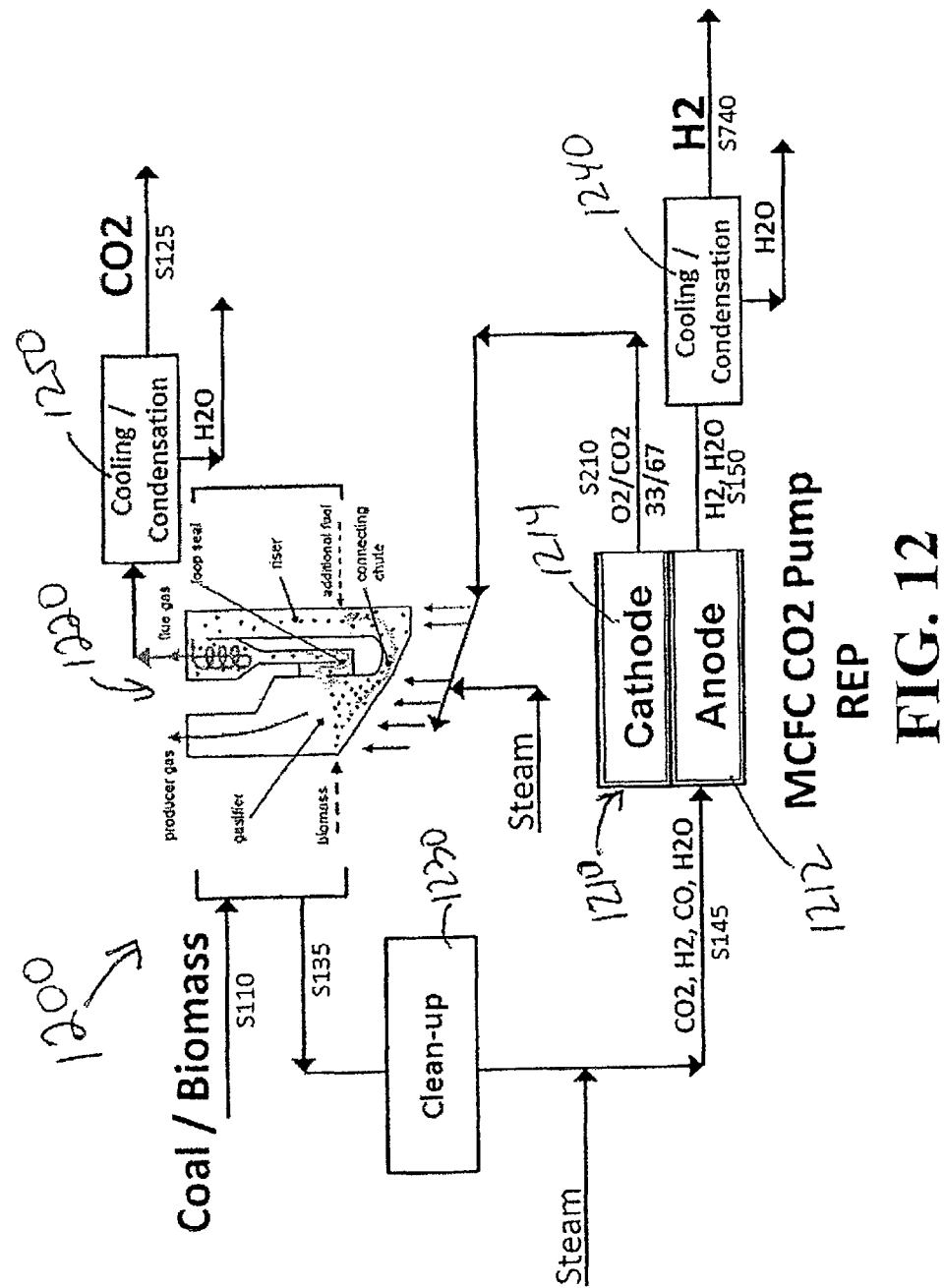
FIG. 12 shows an illustrative configuration of a combined gasifier and REP system that uses the REP assembly of the present invention to purify hydrogen gas produced from a gasifier and/or provide oxygen to the gasifier while producing an off gas suitable for CO2 capture.

FIG. 12 shows an illustrative configuration of the combined gasifier and REP system 1200 which includes a gasifier assembly 1220 and a REP assembly 1210 of the present invention. As shown in FIG. 12, the gasifier assembly 1220 receives carbonaceous fuel 5110, such as coal or biomass, and converts it to syngas containing hydrogen, CO2, CO, H2O, hydrocarbons and impurities such as sulfur. The gasifier assembly 1220 also receives oxidant gas comprising a mixture of CO2 and O2 output from the REP assembly 1210 mixed with steam, and separately outputs flue gas containing CO2 S125.

In the system 1200 of FIG. 12, the syngas S135 produced and output by the gasifier assembly 1220 is conveyed to a clean-up assembly 1230 where the syngas is cleaned to remove impurities such as sulfur. Cleaned syngas comprising CO2, H2, CO and hydrocarbons is then mixed with steam to produce a mixture of CO2, H2, CO, H₂O and any hydrocarbons 5145, and to convey it to an anode side 1212 of the REP assembly 1210. As discussed above, in the REP assembly 1210, any hydrocarbons, such as CH4, are converted to CO2 and H2 by reacting them with water by the following reaction (see, reaction (1) above):

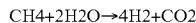

The CO2 produced by the reactions in the REP assembly 1210 is removed by applying a reverse voltage to the REP assembly so that $CO_3^=$ ions generated by the electrolysis reaction pass through the membrane from the anode side 1212 to a cathode side 1214 of the REP assembly. This removal of CO2 drives the reaction toward completion and purifies the H2. Moreover, CO in the input syngas mixture is shifted to hydrogen as the CO2 is removed, thus removing all of the carbon from the syngas. As a result, hydrogen-containing gas comprising almost pure hydrogen syngas is produced in the REP assembly 1210 while co-producing additional H2 through electrolysis and CO2/O2 mixture. The high temperature of the REP assembly reduces the voltage requirement so that power consumed is paid for by the value of the associated additional hydrogen produced by the REP assembly through electrolysis. The hydrogen-containing gas produced in the REP assembly 1210 is output from the anode side 1212 of the REP assembly and thereafter purified by cooling and condensing out any water content in a first cooling assembly 1240. The resulting high purity (95%+) hydrogen gas is output for use in hydrogen devices, such as fuel cell vehicles and industrial uses, or can be compressed and stored for future use and/or transport.

As shown in FIG. 12, the cathode side 1214 of the REP assembly outputs the oxidant gas comprising a mixture of CO2 and O2. As shown and discussed above, this CO2/O2 mixture can be mixed with steam and input into the gasifier assembly 1220. By providing the CO2/O2 mixture output from the REP assembly to the gasifier assembly 1220, some of the steam normally used in the gasifier assembly can be offset by the additional CO2 present in the mixture. Optionally, the CO2 and oxygen may be separated when higher purity oxygen is desired, such as for other types of gasifiers or export. The CO2 from this separation may be captured for sequestration or other uses.

In the system 1200 shown in FIG. 12, an indirect gasifier is employed and produces a flue gas containing pure CO2+ H2O flue gas stream which is ready for capture. As shown, the flue gas is cooled in a second cooling assembly 1250 to condense out the water and pure CO2 is output for capture.

By supplying the CO2/O2 mixture from the REP assembly to the gasifier assembly 1220, any CO2 entrained in the syngas produced by the gasifier assembly is recycled back to the gasifier with oxygen. As a result nearly 100% of the carbon in the feed is captured as CO2 and about 1% of the carbon exits the system 1200 as a methane impurity in the hydrogen gas.

The system 1200 of the present invention is modular in nature and can be sized for the optimal available biomass in a given location. By separating the CO2 from the syngas generated in the gasifier and purifying the hydrogen gas while producing additional hydrogen in the REP assembly, this system makes waste and biomass gasification commercially viable. Moreover, when based on a renewable feedstock, the system produces hydrogen without any net CO2 emissions, even if the CO2 output from the gasifier assembly is not captured.

The above described systems use the REP assembly for many different uses which produce high purity hydrogen while allowing for easy and efficient capture of CO2. The systems described above are scalable for different required sizes and needs, making installation and operation of such systems commercially viable. The configurations and uses of the REP assembly are not limited to the specific system configurations and uses described above.

In all cases it is understood that the above-described arrangements are merely illustrative of the many possible specific embodiments, which represent applications of the present invention. Numerous and varied other arrangements can be readily devised in accordance with the principles of the present invention without departing from the spirit and the scope of the invention.

We claim:

1. A high temperature reformer-electrolyzer-purifier (REP) assembly comprising:
    one or more reformers configured to reform hydrocarbon fuel and output a gas feed comprising steam, and carbon-containing gas that includes $CO_2$, $H_2$, CO, and hydrocarbon fuel;
    at least one fuel cell comprising an anode and a cathode separated by an electrolyte, wherein the anode of the at least one fuel cell is configured to receive the gas feed from the one or more reformers; and
    a power supply configured to apply a reverse voltage to the at least one fuel cell,
    wherein the at least one fuel cell is configured such that, when the power supply applies the reverse voltage to the at least one fuel cell, hydrogen-containing gas is generated in the anode of the at least one fuel cell by a hydrogen generation reaction, and carbon dioxide is separated from the hydrogen-containing gas by an electrolysis reaction in the anode of the at least one fuel cell such that the anode of the at least one fuel cell outputs the hydrogen-containing gas and the cathode of the at least one fuel cell separately outputs an oxidant gas comprising carbon dioxide and oxygen, and
    wherein the power supply is configured to apply the reverse voltage so as to drive a hydrogen generation reaction to near completion by the separation and removal of the carbon dioxide from the hydrogen-containing gas.

2. The high temperature REP assembly in accordance with claim 1, wherein the power supply is configured to apply the reverse voltage so that the hydrogen-containing gas output from the at least one fuel cell comprises 95% or greater hydrogen.

3. The high temperature REP assembly in accordance with claim 1, wherein the at least one fuel cell is a molten carbonate fuel cell.

4. The high temperature REP assembly in accordance with claim 1, wherein the at least one fuel cell is further adapted to perform one or more of:
    reacting methane with water to produce hydrogen and carbon dioxide; and
    shifting carbon monoxide with water to produce hydrogen and carbon dioxide.

5. The high temperature REP assembly in accordance with claim 1, wherein:
    the high temperature REP assembly is configured to operate in a hydrogen producing mode and a power producing mode, and the high temperature REP assembly further comprises a controller configured to control the power supply to apply the reverse voltage to the at least one fuel cell when the high temperature REP assembly operates in the hydrogen producing mode such that the at least one fuel cell generates the hydrogen-containing gas, and the controller is configured to control the power supply not to apply the reverse voltage to the at least one fuel cell when the high temperature REP assembly operates in the power producing mode such that the at least one fuel cell generates power from fuel.

6. A reformer-electrolyzer-purifier (REP) system comprising:
the high temperature REP assembly in accordance with claim 1; and
a heater configured to heat the gas feed so as to vaporize water into steam prior to conveying the gas feed to the at least one fuel cell.

7. The REP system in accordance with claim 6, further comprising a hydrogen purification assembly configured to receive the hydrogen-containing gas output from the high temperature REP assembly and to further purify the hydrogen in the hydrogen-containing gas.

8. A power production and hydrogen generation system comprising;
the high temperature REP assembly in accordance with claim 1; and
a high temperature fuel cell system, comprising at least one high temperature fuel cell stack;
wherein the high temperature fuel cell system is configured to receive fuel and one or more of air and the oxidant gas output from the high temperature REP assembly and to generate an electrical power output, and
wherein an anode side of the high temperature fuel cell system is configured to output anode exhaust, and the anode of the high temperature REP assembly is configured to receive said anode exhaust as the gas feed for generating the hydrogen-containing gas.

9. The power production and hydrogen generation system of claim 8, wherein a cathode side of the high temperature fuel cell system is configured to receive the oxidant gas output from the high temperature REP assembly and to output cathode exhaust to a cathode of the high temperature REP assembly.

10. The power production and hydrogen generation system of claim 8, wherein the power supply of the high temperature REP assembly is configured to use all or a portion of the electrical power output generated by the high temperature fuel cell system to apply the reverse voltage to the at least one fuel cell.

11. A hydrogen generation system for generating hydrogen and electrical power, the system comprising:
the high temperature REP assembly in accordance with claim 1; and
a low temperature fuel cell system configured to receive the hydrogen-containing gas output from the high temperature REP assembly and to generate electrical power.

12. The hydrogen generation system in accordance with claim 11, wherein the low temperature fuel cell system comprises a PEM fuel cell system.

13. An energy storage system for storing excess power, the system comprising:
the high temperature REP assembly in accordance with claim 1; and
a fuel cell power producing assembly for generating power,
wherein a first portion of anode exhaust output from an anode side of the fuel cell power producing assembly is conveyed to the high temperature REP assembly for use as the gas feed, and
wherein when excess power is available, the power supply applies the reverse voltage to the at least one fuel cell of the high temperature REP assembly so as to generate hydrogen from the first portion of the anode exhaust.

* * * * *